Aug. 11, 1959   H. K. SMITH ET AL   2,899,040
ELECTRICAL CONTROL SYSTEM FOR RACK TYPE PROOFER
Filed Oct. 25, 1954   14 Sheets-Sheet 1
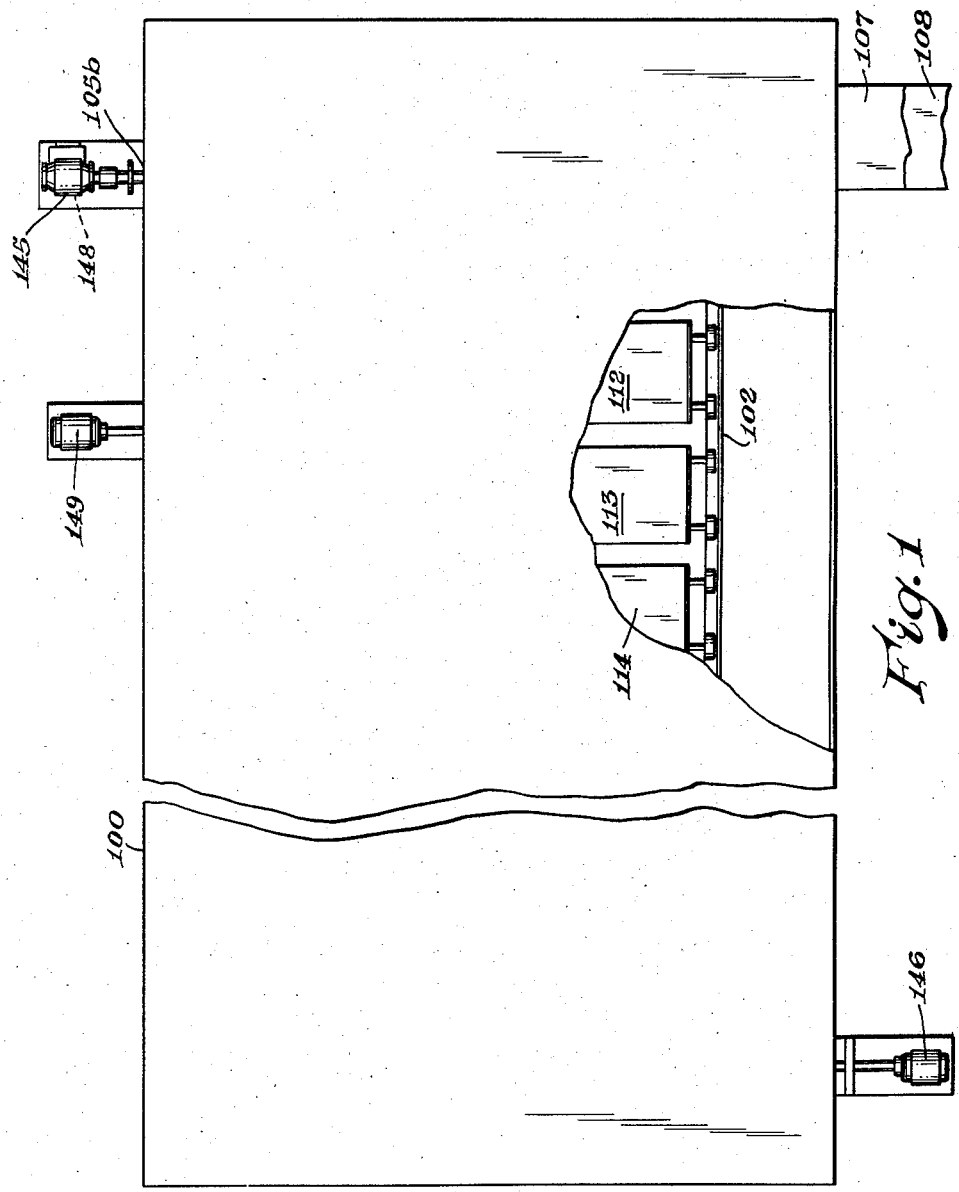
INVENTORS
Harold G. Smith
Charles G. Gibbons
BY Tearman + Tearman
ATTORNEYS

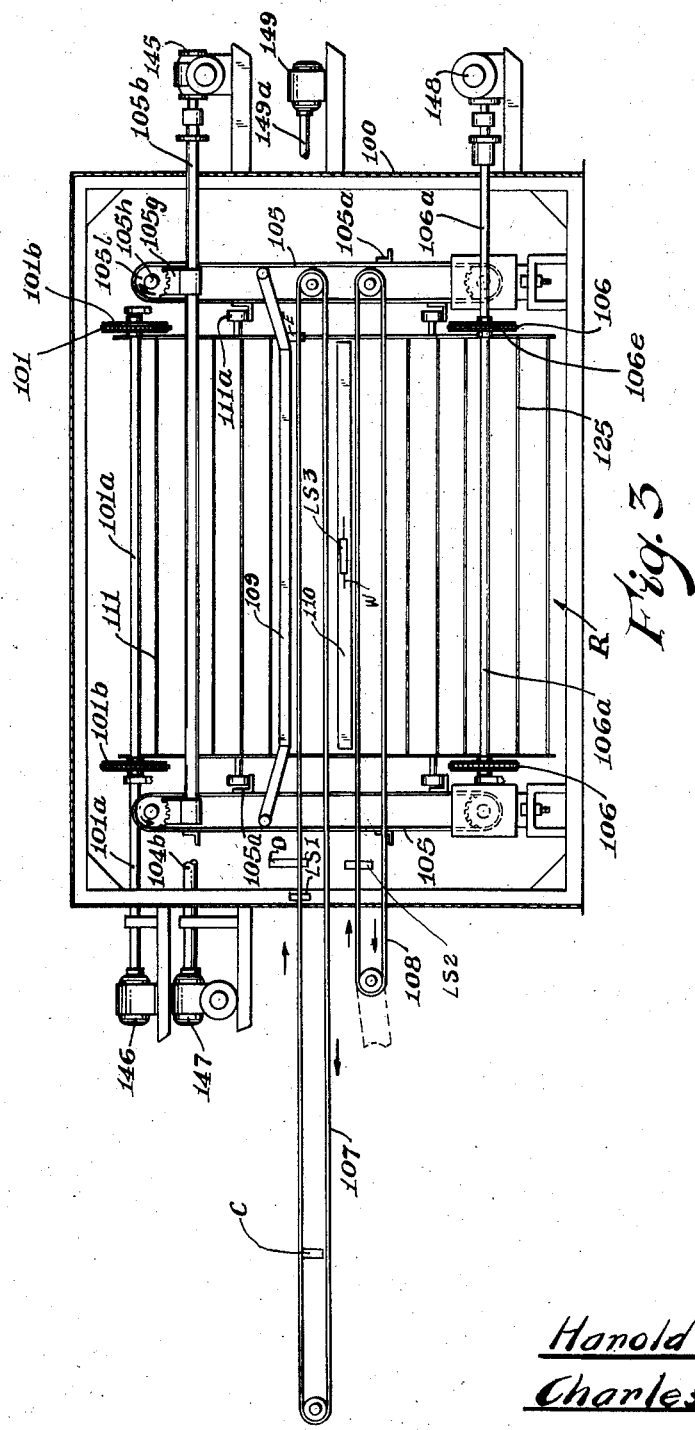

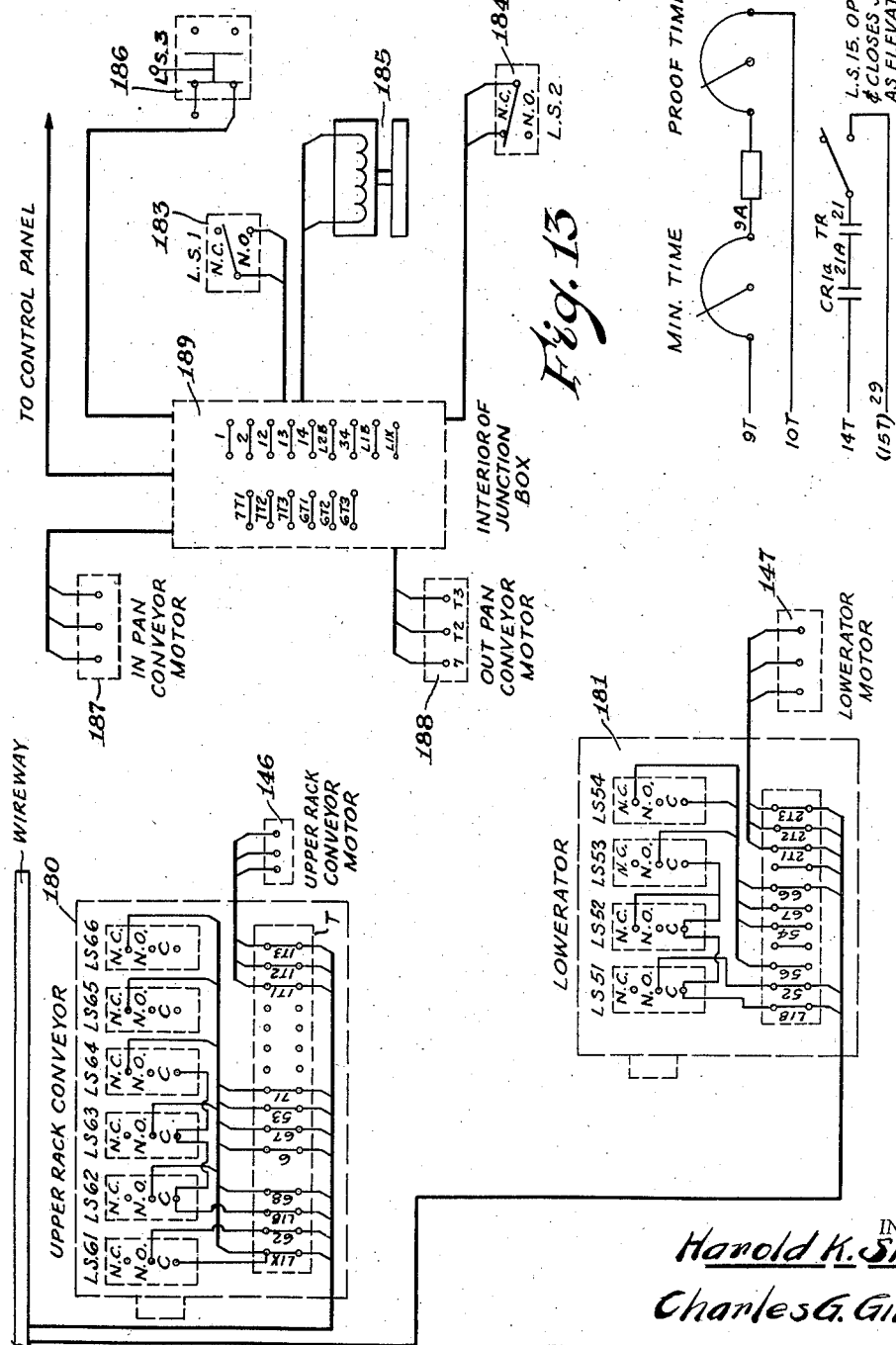

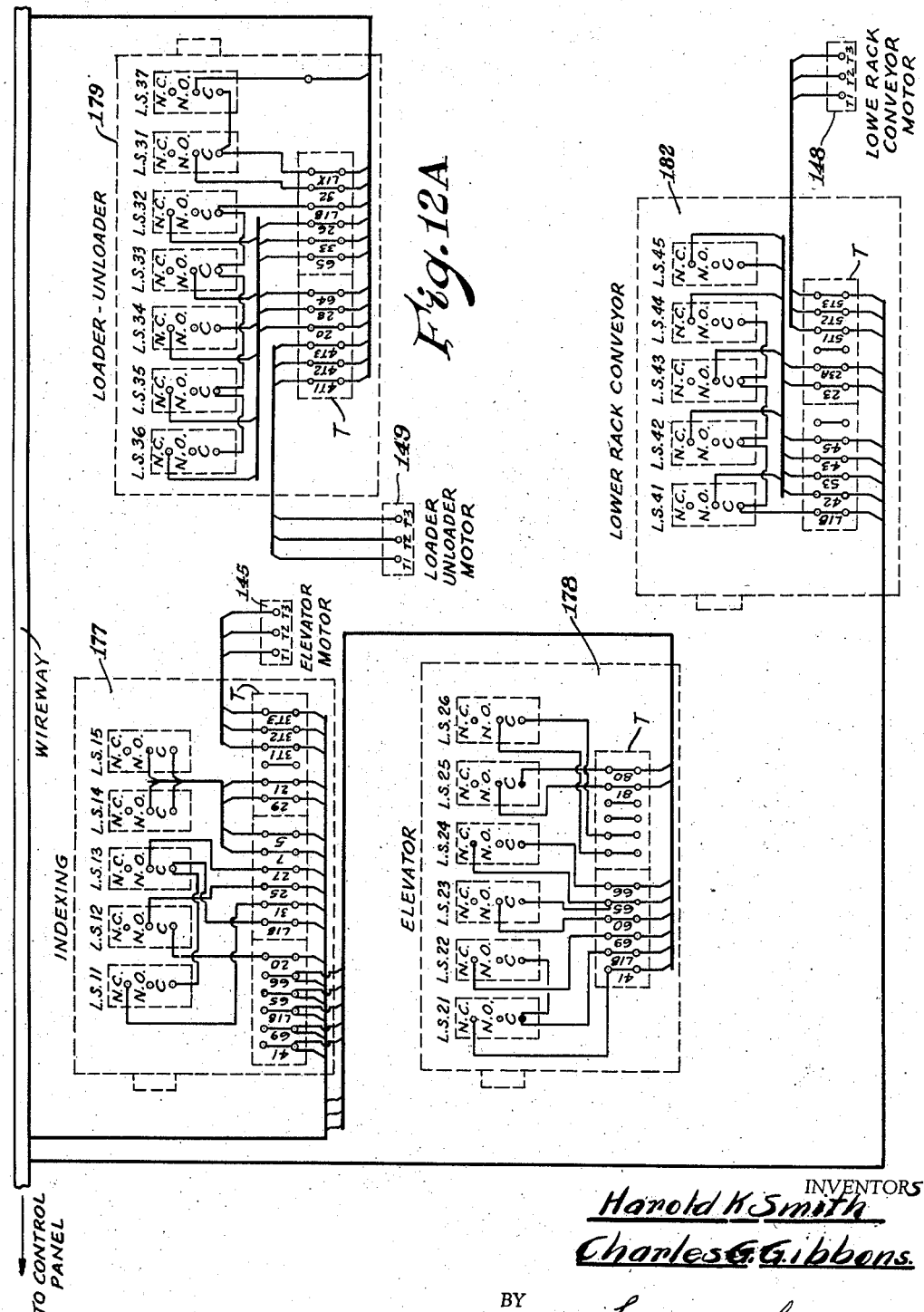

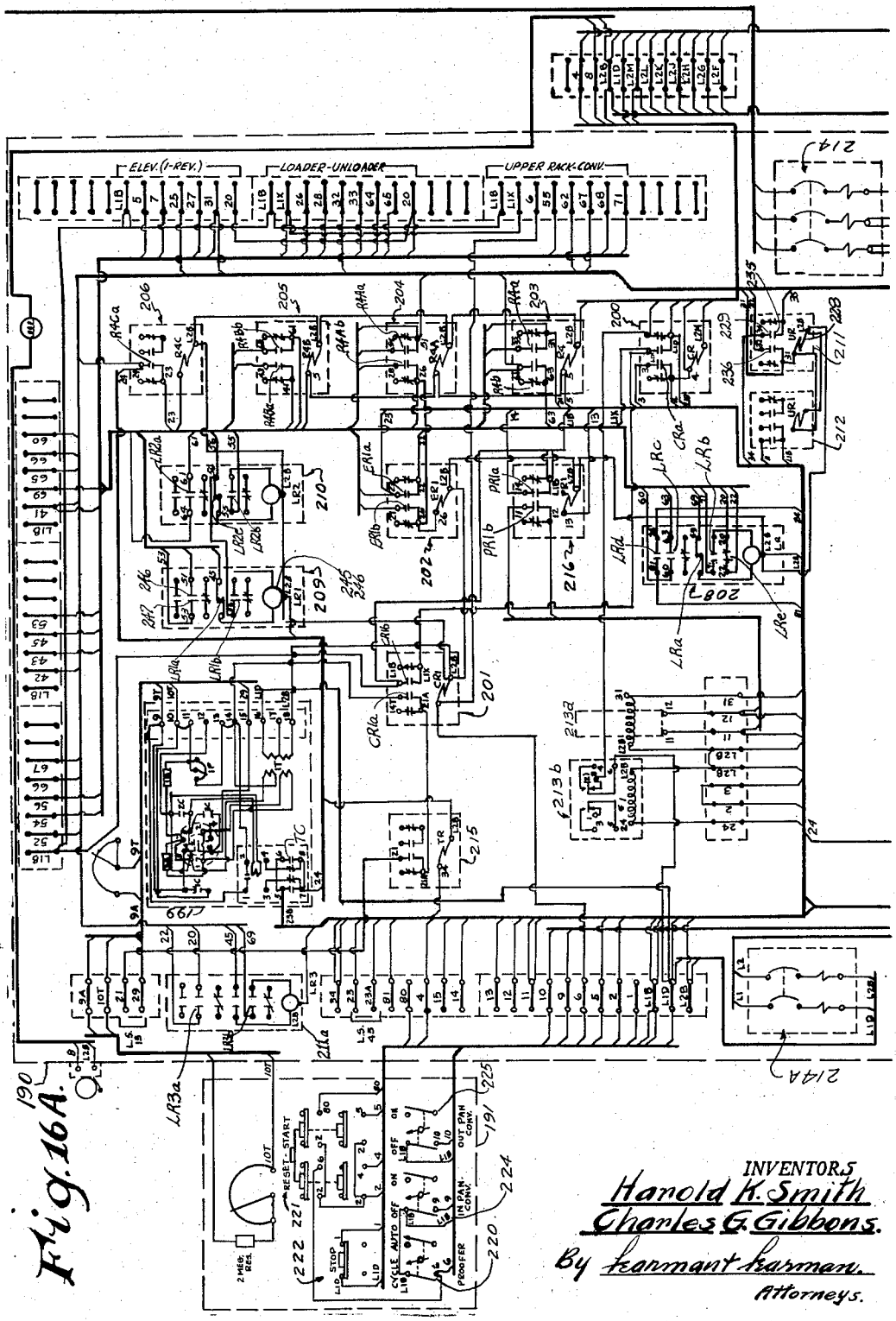

Aug. 11, 1959 H. K. SMITH ET AL 2,899,040
ELECTRICAL CONTROL SYSTEM FOR RACK TYPE PROOFER
Filed Oct. 25, 1954 14 Sheets-Sheet 10

INVENTORS
Harold K. Smith.
Charles G. Gibbons.
By Fearment Harman
Attorneys

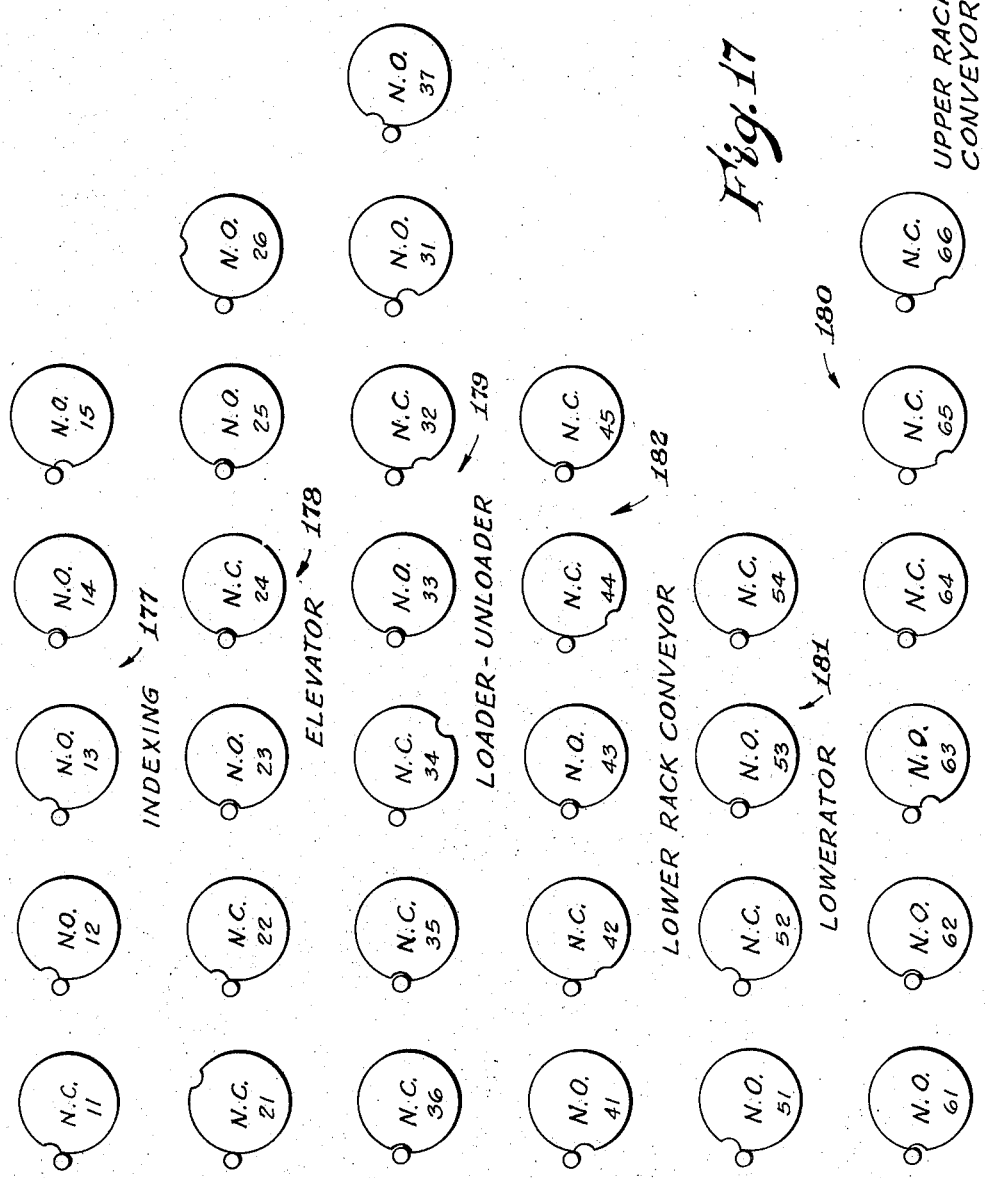

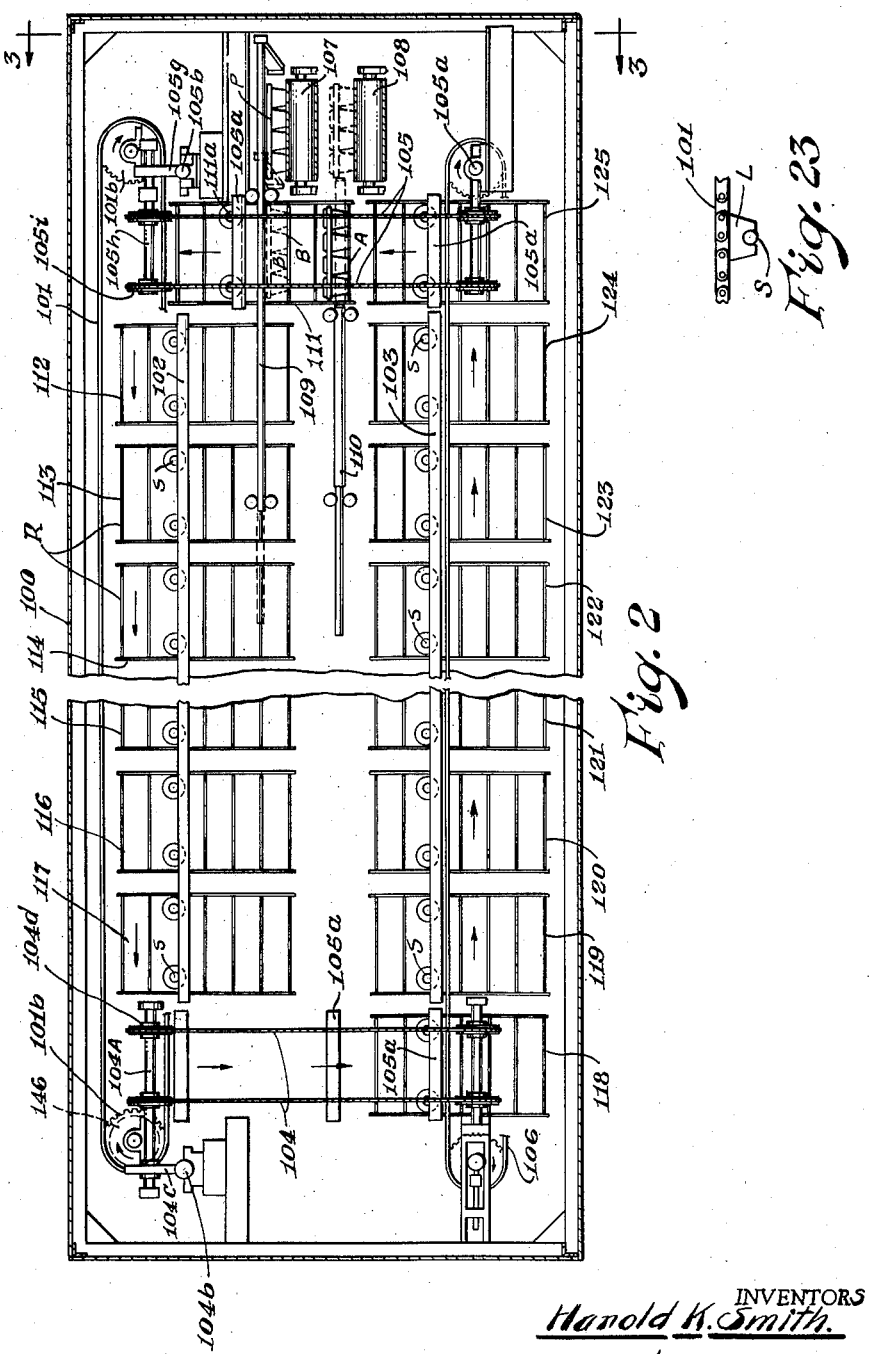

United States Patent Office 2,899,040
Patented Aug. 11, 1959

2,899,040

ELECTRICAL CONTROL SYSTEM FOR RACK TYPE PROOFER

Harold K. Smith and Charles G. Gibbons, Saginaw, Mich., assignors to Baker Perkins, Inc., Saginaw, Mich.

Application October 25, 1954, Serial No. 472,074

18 Claims. (Cl. 198—85)

This invention relates broadly to a final steam proofer for use in bakery operations and more particularly to an electric control system for automatically controlling the cycle of operations of the proofer.

One of the prime objects of the invention is to provide an electric control system for automatically governing a program of operations in a proofer, from the time the formed pastry products are received from the molder through various stages of conditioning the products, to the time that the conditioned products are delivered to the oven for baking.

Another object of the invention is to provide a system for automatically controlling a multiplicity of driving motors for performing various sequential operations in a proofer with reset circuit means for restarting the normal cycling of the system at any particular period in the sequential operation thereof when a particular unit or particular units have for any reason been interrupted during their normal cycle of operation prior to the normal completion thereof.

Another object of the invention is to provide a steam-activated rack proofer, control system capable of conditioning bread and pastry products on a mass baking scale, handling racks of the order of eleven or more, each carrying trays of pastry products of the order of seven or more with means for progressively moving the racks through a cycle of operations within the proofer for conditioning the pastry products preparatory to baking where the progressive movement of the tray-loaded racks is automatically controlled, including loading and unloading thereof through a cyclically controlled program.

Still another object of the invention is to provide an arrangement of reset circuit means for a program-controlled proofer in a bakery system employing a multiplicity of driving motors operating conveyor and elevator arrangements within the proofer, where each of the motors is individually controlled by limit switches operating in timed relation to the individual motors, with means for resetting the operation of the system at any time after an interruption of the cycle of operation of any unit and picking up the operation in sequence from the point at which it was interrupted.

Other and further objects of the invention reside in the construction of the program-controlled apparatus, associated limit switches, rack-conveyor system, elevator associated therewith, and loading and unloading apparatus for delivering trays of molded pastry products and removing conditioned trays of such products from the racks, all as more fully set forth in the specification hereinafter following by reference to the accompanying drawings, in which:

Fig. 1 is a schematic plan view of the rack type proofer in which the electrical control system of the invention is employed, the bread pans and certain details of the mechanism being omitted from the view in the interests of clarity.

Fig. 2 is a schematic, side elevational view of the rack-type proofer shown in Fig. 1 with certain details of the mechanism and the bread pans similarly omitted except where they are included to illustrate the operation of the loader and unloader bars.

Fig. 3 is a transverse sectional view taken on the line 3—3 of Fig. 2 through the rack type proofer, schematically illustrating the arrangement of conveyors and controlling motors which are operated by the electrical control system of the invention, the pans and certain other details such as the lugs on the upper and lower rack conveyor chains being similarly omitted.

Figure 4:
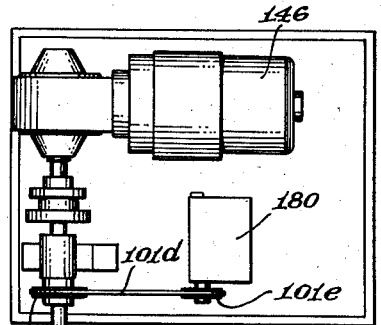

Fig. 4 schematically illustrates the motor arrangement for the upper conveyor of the proofer in more detail.

Figure 5:
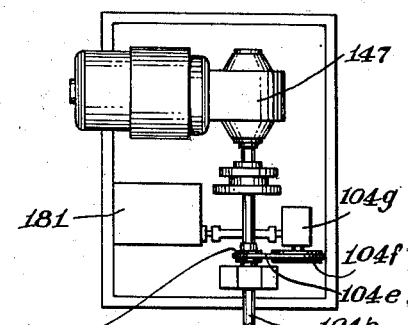

Fig. 5 schematically illustrates in greater detail the lowerator motor for the proofer.

Figure 6:
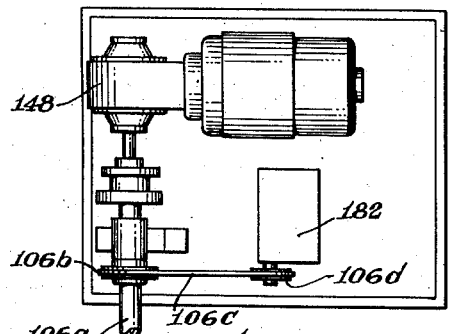

Fig. 6 shows the motor arrangement for the lower conveyor of the proofer in greater detail.

Figure 7:
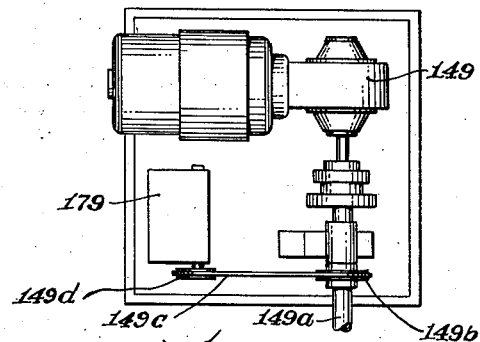

Fig. 7 schematically shows the arrangement of the loading and unloading motor for the proofer in greater detail.

Figure 8:
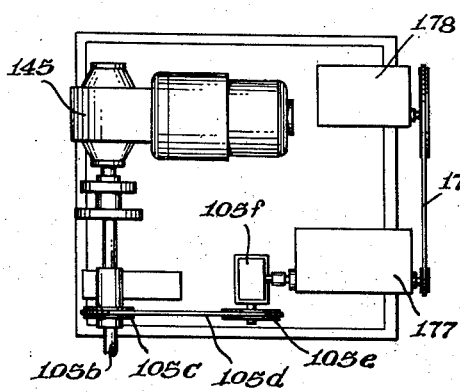

Fig. 8 shows the motor arrangement for the elevator of the proofer in greater detail.

Figure 9:
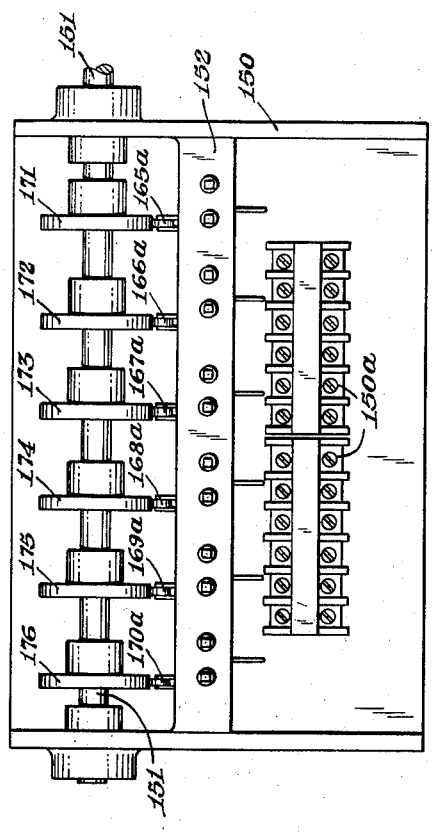

Fig. 9 is a plan view of a switch control system for the electrical control system of the invention.

Figure 10:
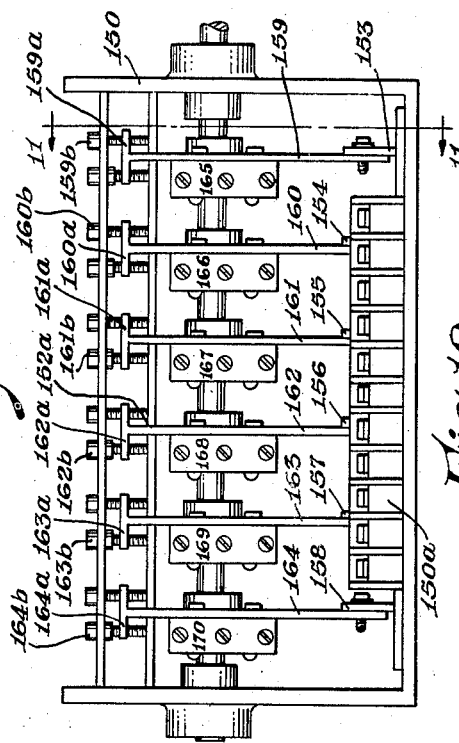

Fig. 10 is a side elevational view of a switch system for the electrical control system.

Figure 11:
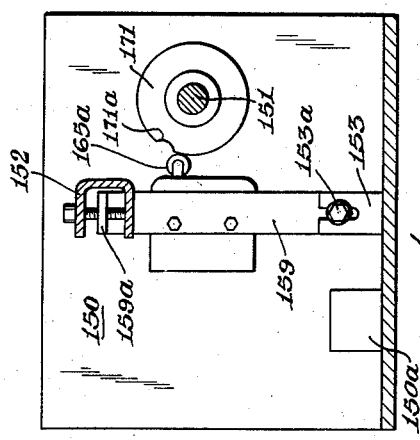

Fig. 11 is a transverse sectional view taken on line 11—11 of Fig. 10.

Figs. 12A and 12B, when assembled in longitudinally aligned relation, show a layout wiring diagram illustrating the individual limit switches associated with the individual driving motors in the electrical control system of the invention.

Fig. 13 is a layout diagram showing the arrangement of the in-pan and out-pan conveyor motors and the associated means for controlling the operation thereof according to the movement of the trays into loading and unloading positions in the proofer system.

Figure 14A:
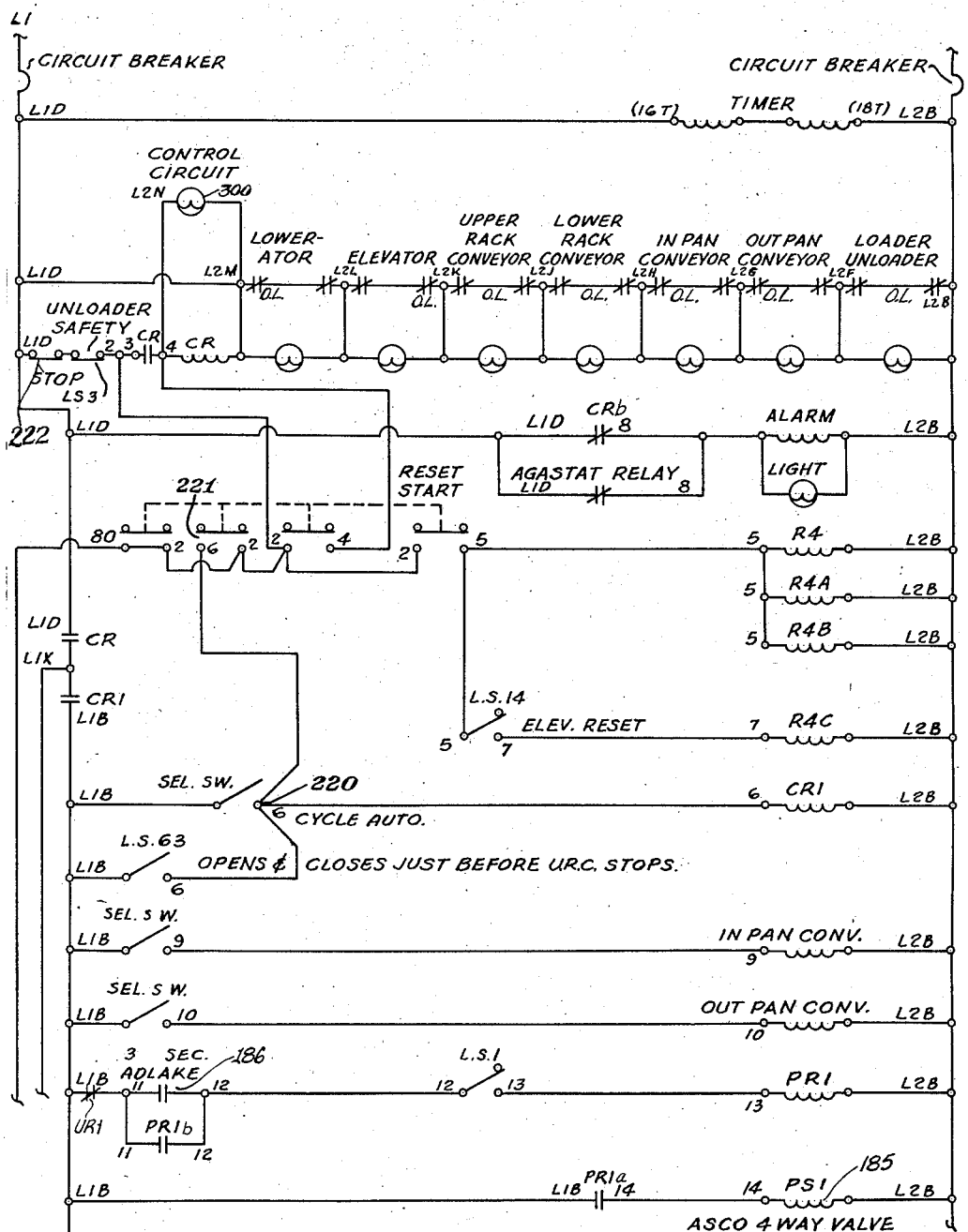
Figure 14B:
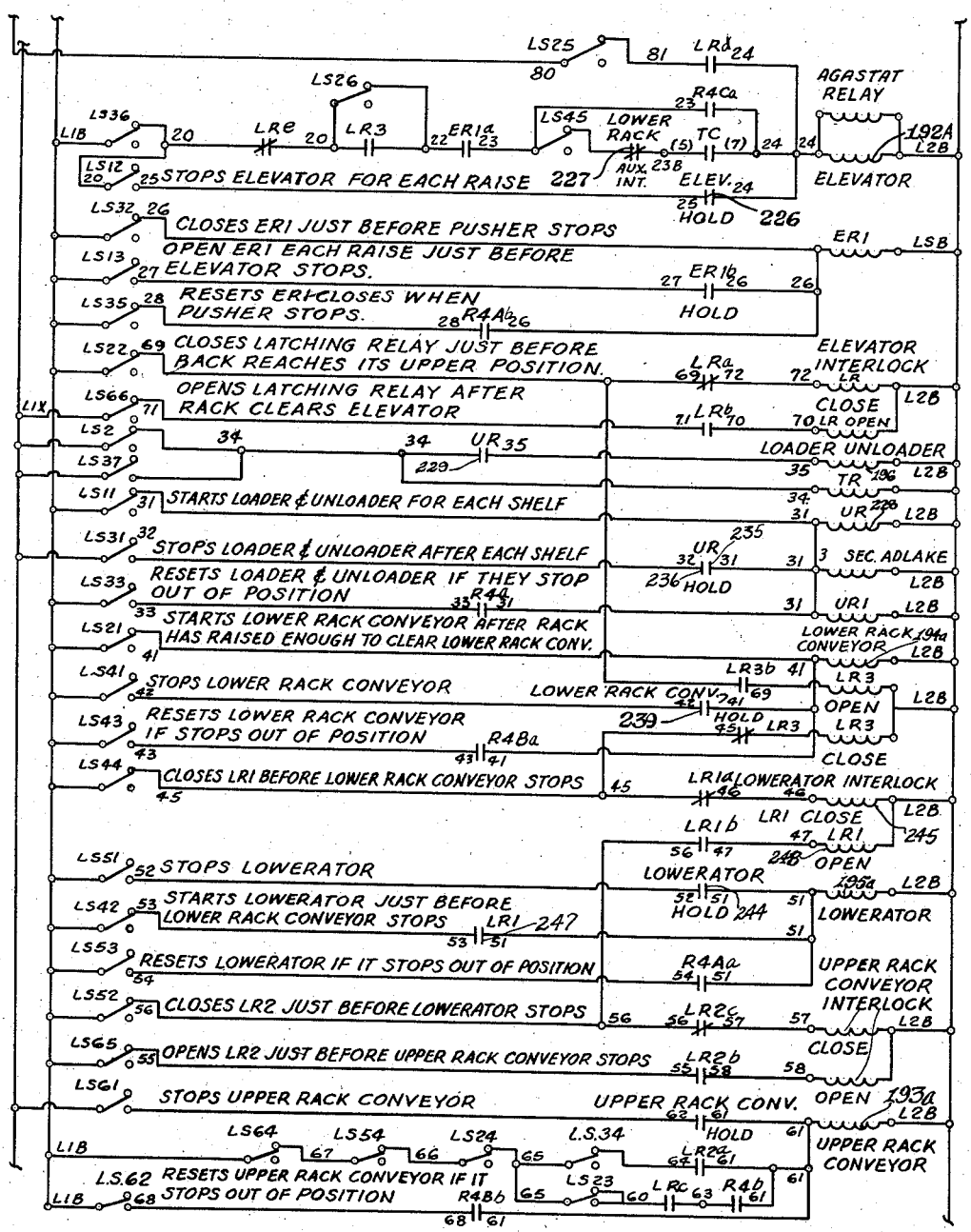

Figs. 14A and 14B collectively show the line diagram of the rack-type proofer, it being necessary to align these figures one below the other in order to view the entire program circuit.

Fig. 15 is a fragmentary line diagram of the adjacent control means associated with the time control in the system of this invention.

Figure 16B:
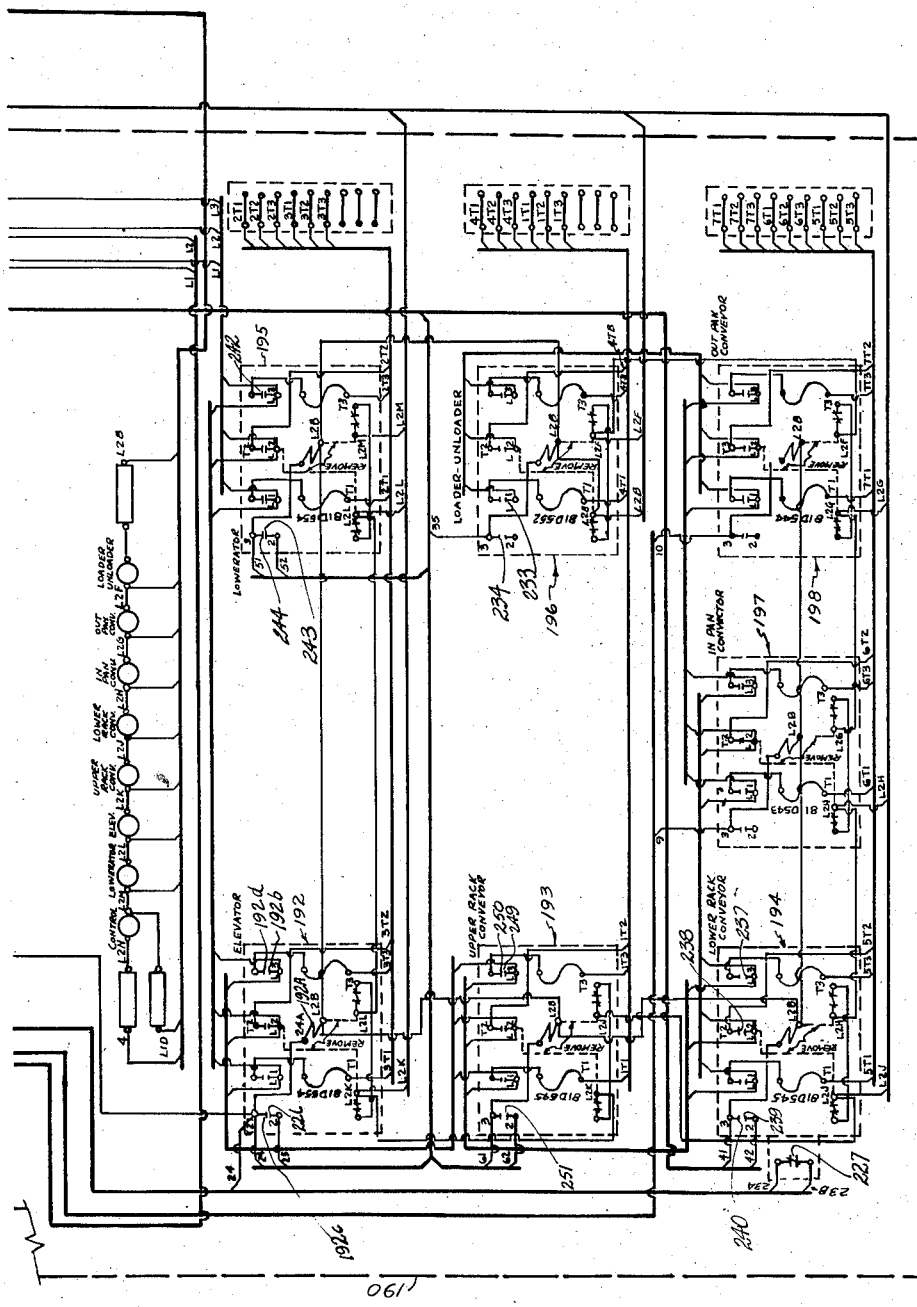

Figs. 16A and 16B show, when assembled one below the other, a more detailed schematic diagram of the electrical control system.

Fig. 17 is a schematic view showing the arrangement of controlling cams for the electrical control system.

Figure 18:
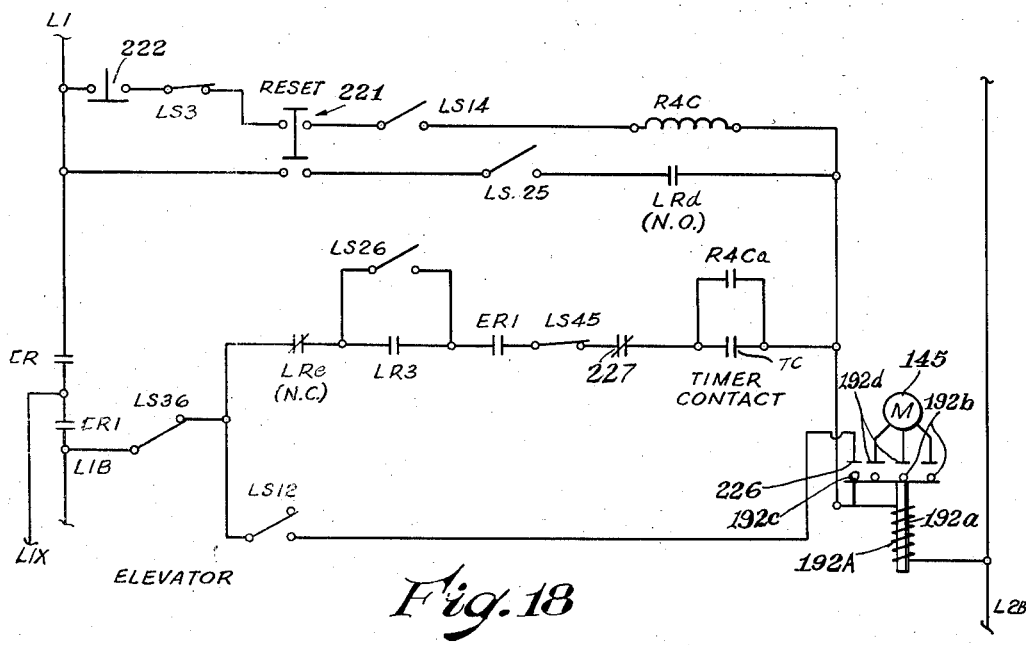

Fig. 18 is an enlarged, fragmentary, more detailed view of that part of the circuit diagram which illustrates the manner in which the elevator motor is started, stopped, and restarted if it has been stopped prior to completion of its normal cycle.

Figure 19:
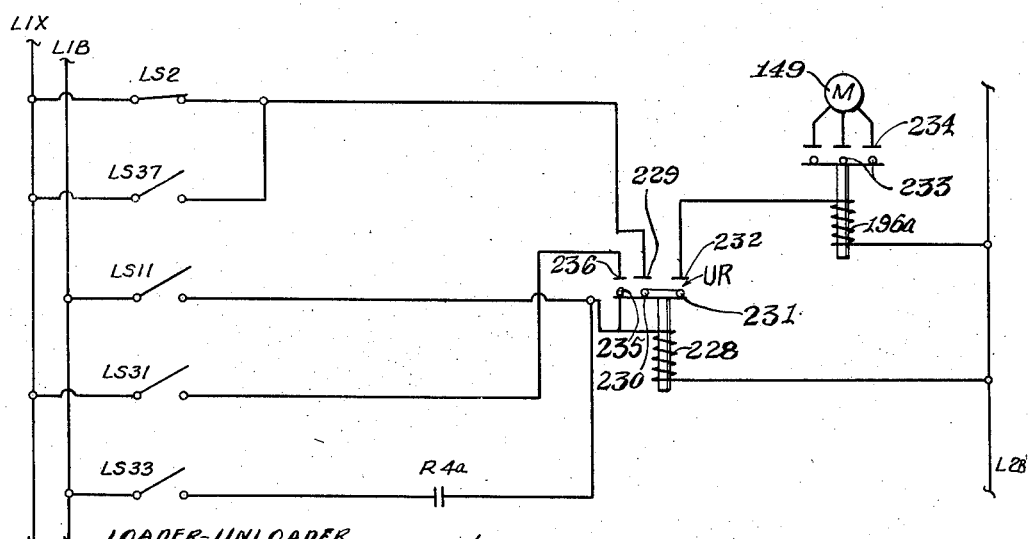

Fig. 19 is a similar view illustrating controlling circuits for the loader-unloader motor in detail.

Figure 20:
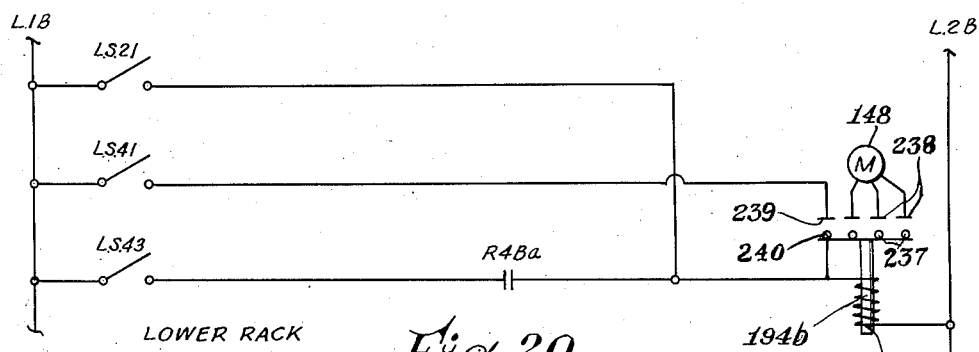

Fig. 20 is a similar view illustrating controlling circuits for the lower rack conveyor motor.

Figure 21:
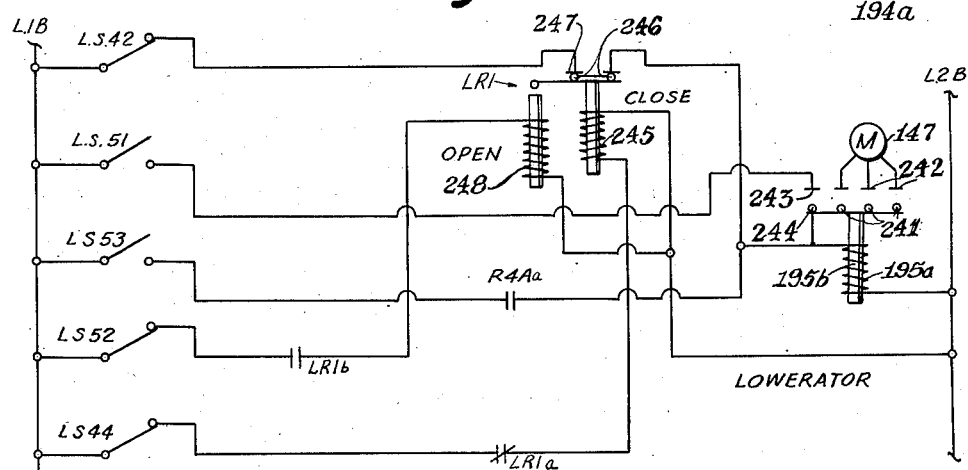
Figure 22:
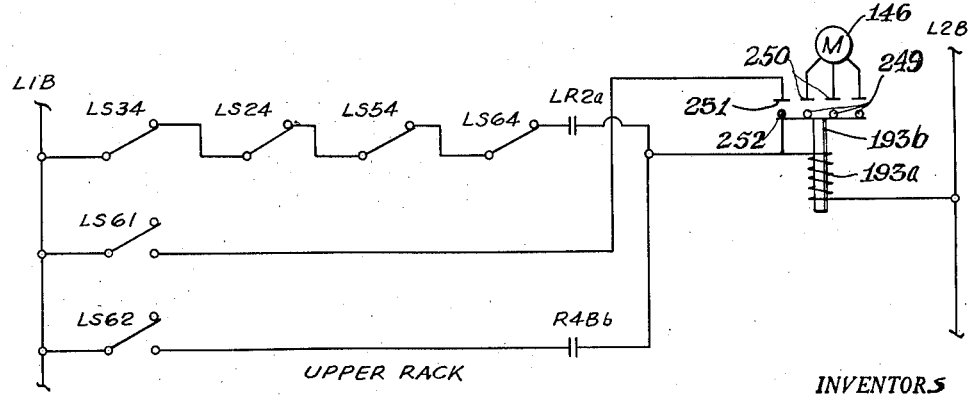

Fig. 21 is a similar view illustrating controlling circuits for the lowerator motor, and Fig. 22 is a similar view illustrating controlling circuits for the upper rack conveyor motor.

Fig. 23 is a fragmentary, side elevational view illustrating the manner in which one of the lugs on the upper and lower rack conveyor chains moves a rack.

The proofer of this invention has been developed to facilitate mass operations in large bakeries where bread and pastry products, after being molded and deposited on trays, are automatically subjected to a conditioning operation by progressively loading the trays on racks which are advanced at a controlled speed by a conveyor system through the conditioning atmosphere of the proofer and returned to a conveyor system for delivery to the baking oven. The conveyor system operates on two levels and employs in its operation five motors, that is, an elevator motor; a loader-unloader motor; upper rock conveyor motor; lowerator motor; lower rack conveyor motor; and in addition, two conveyor motors for the in-pan conveyor and the out-pan conveyor. The controls are arranged on a panel mounted adjacent to the front of the proofer. The control push buttons and the timer dial mechanism are mounted in a control station located at the side of the panel. The panel includes seven motor starters, that is, a motor starter individual to each of the said drive motors, the timer, control relay equipment, four reset relays, four latching interlock relays, a three-second timer, a thirty-five second timer, a control circuit breaker, and a line circuit breaker. This equipment electrically connects with the drive motors heretofore referred to.

Multiple rotary limit switches are associated with the elevator motor, loader-unloader motor, upper rack conveyor motor, lowerator motor, and lower rack conveyor motor for sequentially controlling the program of operation thereof. The electrical circuits operate in predetermined sequential operation for governing the time of operation of the several motors. The in-pan and out-pan conveyor motors are controlled by on-off selector switches. Pan-operated microswitches located in the in-pan and out-pan conveyors and associated time regulated means are provided for insuring the continuous and orderly delivery of loaded trays containing the molded bread and pastry products to the proofer and the discharge of the conditioned products from the proofer for delivery to the baking oven.

The principal control functions are equipped with single bell and/or light alarms to enable the operation of the system to be readily observed and to facilitate location of any malfunction.

Referring to the drawings in more detail, Figs. 1, 2 and 3 show the general arrangement of the proofer embodying a housing or enclosure 100 housing a plurality of racks R for pastry and bakery products, the racks being shown as having seven shelves to the rack (see Fig. 2); however, obviously, the racks will have any desired number of shelves. The proofer houses an upper rack conveyor 101 operating longitudinally of the housing adjacent a longitudinally extending upper rack trolley rail 102 disposed above a longitudinally extending lower rack trolley rail 103. The longitudinally extending upper and lower rack trolley rails 102 and 103 terminate short of the interior ends of the housing 100 providing space for the installation of the lowerator conveyor 104 at the rear of the interior of the housing and an elevator conveyor 105 located toward the front of the interior of the housing. A lower rack conveyor 106 extends longitudinally of the housing from a position adjacent the lowerator conveyor at the rear of the interior of the housing to a position adjacent the elevator conveyor 105 adjacent the front of the interior of the housing. The front of the proofer is so located in position with reference to the molder or panner that the in-pan conveyor 107 may extend into the proofer for delivering the loaded pans to a position represented in Fig. 2 from which the loaded pans may be automatically moved onto the shelves of the rack which is moved into position aligned with the in-pan conveyor as represented particularly in Figs. 2 and 3. A similar operation occurs with respect to the unloading of the rack after the rack has progressed through the proofer and where an out-pan conveyor 108 receives the conditioned pans and moves the conditioned pans to the oven. The loader and unloader members are represented at 109 and 110 respectively.

The racks R are indicated at 111–125 arranged in the positions in which they progress through the proofer under the control of the upper rack conveyor 101, the lowerator conveyor 104, the lower rack conveyor 106, and the elevator conveyor 105. The loaded racks are progressed through the proofer in a lineal direction on the upper rack conveyor 101 from the right toward the left as viewed in Fig. 2, after being successively transferred from the elevator conveyor 105 to the upper rack conveyor 101. The racks are then successively transferred to the lowerator conveyor 104 and lowered out of the path of the upper rack conveyor 101 and into the path of the lower rack conveyor 106 from which the racks are successively progressed in a lineal direction from the left toward the right as viewed in Fig. 2 where they are successively transferred to the elevator conveyor 105 and indexed upwardly one shelf at a time. Shelves A and B, indicated in Fig. 2, are shown in alignment with the unloader member 110 which pushes the loaded conditioned pans onto the out-pan conveyor 108 and in alignment with the loader member 109 respectively which pushes pans from the in-pan conveyor 107 to the shelf B. The pusher bars 109 and 110 are connected by linkage (not shown) which permits them to be simultaneously actuated in opposite directions, the linkage being driven from a single loader-unloader motor. This mechanism forms the subject matter of the instant assignee's co-pending application Serial No. 430,292, and it will not be necessary to further show or describe it here.

The lowerator conveyor 104 and elevator conveyor 105 each comprises endless sprocket chain conveyors situated on opposite sides of the upper and lower rack conveyors 101 and 106, respectively, and provided with inwardly directed platforms or brackets represented at 105a in Fig. 3, for example, which engage beneath roller members, such as 111a, for example, carried by rack 111 for supporting the rack independently of the upper and lower rack conveyors 101 and 106. Inasmuch as the lowerator and the elevator conveyors 104 and 105 are of similar construction, brackets 105a, supporting the rollers 111a carried by the racks R, have been illustrated as representative of the brackets on each of the conveyors and the rollers on each of the racks. Spaced-apart lugs L (see Fig. 23) on the upper and lower rack chain conveyors 101 and 106 are engageable with the shafts S which support the rollers 111a of the racks R for moving the latter longitudinally as desired on the tracks 101 and 103, and it will be apparent that the lugs move the racks from the tracks 101 and 103 onto the brackets 105a carried by the lowerator and elevator conveyors 104 and 105 respectively when the latter are indexed into alignment with the tracks. When the lowerator is actuated, the racks simply move down out of the slots in the lugs L and similarly, the elevator moves the shafts S on a rack up into the slots in the lugs L. If desired, of course, the ends of the tracks 101 and 103 could be inclined to deliver or remove the racks by gravity to or from the members 105a, when the rollers provided on the racks are indexed into alignment with the tracks. Freely disengageable, spaced-apart lugs mounted on the chain conveyors 101 and 106 could, of course, initiate the action. It will be understood that the racks are successively moved off the brackets or platforms 105a of the elevator conveyor 105 onto the upper rack conveyor track 102.

The transfer of successive racks sequentially from upper rack conveyors 101 to lowerator 104 is positively effected by movement of the end rack from the upper rack trolley rail 102 into a position in which members 105a carried by the lowerator chains (Fig. 2) receive and support the racks successively discharged from the end of the upper rack conveyor 101. The lowerator 104 lowers the loaded rack to the position indicated in Fig. 2, whereupon the rack is aligned with the lower rack trolley rail 103 and members L carried by lower rack conveyor 106 which positively move the rack in a right-hand direction (as viewed in Fig. 2).

After the rack reaches the position 124 and is moved to the position 125 on the member 105a of the elevator 105, the elevator indexes the rack through the loading and unloading positions A and B to the position 111 for re-cycling through the proofer after the unloading and the loading operations are effected.

In order to facilitate movement of the molded products from the panner to the proofer, the in-pan conveyor 107 is co-ordinated with the movement of conveyor 108 leading from the panner, as represented more particularly in Figs. 1 and 2.

For the purpose of insuring a proper conditioning atmosphere within the proofer, air-conditioning ducts (not shown) are distributed throughout the proofer and connected with blowers (not shown) exteriorly supported on the proofer housing.

The control motors with their associated individual limit switches are mounted exteriorly of the proofer. The elevator motor is indicated at 145; the upper rack conveyor motor is indicated at 146; the lowerator motor is shown at 147; the lower rack conveyor motor is indicated at 148; and the loader and unloader motor is shown at 149. The several motors are mounted as individual units and each is associated with a limit switch assembly driven in timed relation to the operation of the motor which has a part in controlling the operation of the particular motor and other of the motors. The arrangement of the motor units with respect to the proofer mechanism and the manner of driving the limit switches in coordination with the operation of each of the motors is shown more clearly in Figs. 4–8 from which it will be noted that the elevator motor 145 (Fig. 8) is associated with microswitch assembly 177 which controls the indexing of the elevator motor and the starting of the loader-unloader motor 149. Microswitch assembly 178 which is also associated with the elevator motor 145, controls the starting of the lower rack conveyor motor 148 and includes interlocking means for controlling also motors 145 and 146. For this purpose, the shaft of the elevator motor, indicated at 105b, carries sprocket wheel 105c which drives sprocket chain 105d which is trained over sprocket wheel 105e for driving the gear system 105f, which in turn drives microswitch assembly 177. The microswitch assembly 177 in turn drives a sprocket and chain system, represented at 177a which operates the microswitch assembly 178. The transversely disposed shaft 105b (see Fig. 3) has gear boxes 105g driving the shafts 105h on which the elevator sprocket wheels 105i are mounted. The elevator motor unit 145 is the only one of the several motor units which operates two microswitch assemblies. All of the other motors 146–149 each operate a single microswitch assembly. For example, the loader-unloader motor 149 operates microswitch assembly 179 as shown in Fig. 7 wherein shaft 149a which extends to the mechanism shown and described in my aforementioned co-pending application for operating loader 109 and unloader 110 is provided with a sprocket wheel 149b which is connected to sprocket chain 149c with sprocket wheel 149d carried by the shaft of microswitch assembly 179.

Upper rack conveyor motor shown at 146 in Fig. 4 has microswitch assembly 180 associated therewith. Shaft 101a of the upper rack conveyor which drives the rear upper rack conveyor sprocket 101b carries sprocket wheel 101c which drives sprocket chain 101d for operating sprocket wheel 101e for driving the microswitch assembly 180 which in part controls and interlocks motor 146 and certain of the other motors. The upper rack conveyor chain 101 is, of course, trained around the sprockets 101b. In Fig. 5, the lowerator motor 147 has been shown operating microswitch assembly 181 through a sprocket wheel 104a carried by shaft 104b which through gear boxes 104c similar to 105g drives the upper lowerator conveyor sprockets 104d on the shaft 104A, the sprocket 104a being connected through sprocket chain 104e with the sprocket wheel 104f which drives the gear system 104g, which in turn drives the microswitch assembly 181 for in part controlling motor 147 and the associated motors.

Fig. 6 shows the association of microswitch assembly 182 with the lower conveyor motor 148 where shaft 106a of the lower conveyor drives sprocket wheel 106b which in turn drives sprocket chain 106c for driving sprocket wheel 106d associated with the limit switch assembly 182 which electrically stops motor 148 and electrically interlocks and/or starts the associated motors. The assembly 182 interlocks and starts motor 146 and interlocks motor 145 as will be later described. The shaft 106a, of course, drives the sprockets 106e of the lowerator conveyor.

The limit switch assemblies vary in detail structure for each of the motor controls but the general construction thereof is as set forth in Figs. 9–11. In this arrangement, the frame of the microswitch assembly is indicated at 150 providing journalling means for the cam shaft 151 which will be driven from one of the motors in the manner previously described. The frame 150 provides a support for a channel-shaped bracket 152 which extends lineally of the frame midway of the width thereof and adjacent the top of the frame as shown more clearly in Fig. 11. The interior side of the channel 152 is provided with slots 152a disposed at spaced intervals along the length thereof. Aligned with the channel 152 and supported on the frame 150, there are mounted individually slotted brackets 153, 154, 155, 156, 157 and 158 directed toward the spaced slots 152a in the channel 152 for providing adjustable mounting means for the ends of the adjustable mounting bars shown at 159, 160, 161, 162, 163 and 164. These adjustable mounting bars each pass through the spaced slots 152a in channel 152 and terminate in substantially T-shaped heads 159a, 160a, 161a, 162a, 163a, and 164a which are engaged by means of adjustment screws which pass through channel 152 as shown at 159b, 160b, 161b, 162b, 163b and 164b. Because the brackets 153–158 are slotted and are engaged by coacting set screws 153a–158a passing through bars 159–164, the bars are accurately adjustable to positions fixed by the adjustment screws 159b–164b. The adjustable bars 159–164 serve as mounting means for the microswitches 165, 166, 167, 168, 169 and 170. Each of the microswitches includes projecting actuator members having rollers thereon, represented more clearly in Figs. 9 and 11 at 165a, 166a, 167a, 168a, 169a and 170a. These actuating rollers engage peripheral recesses in the actuating cams 171, 172, 173, 174, 175 and 176 mounted on shaft 151. I have represented a typical peripheral recess at 171a in Fig. 11 into which the switch actuator 165a is adapted to project when cam 171 moves to a position aligned with the actuator. The switch contacts within the microswitch may be normally closed or normally open in the position illustrated in Fig. 11 and are moved to either open or closed positions respectively when actuator 165a drops into the recess 171a in cam 171. Electrical connection is made to the several microswitches 165–170 through the terminal connections on the terminal block represented at 150a. These cam switches are well known in the art and include a normally open terminal, a normally closed terminal, and a common contact connected to the line leading to the switch, the other line connection being made to the N.O. or N.C. terminal as desired, dependant on whether the switch is to be normally open or normally closed. A normally open switch is one in which the circuit is open when the contact roller is in the depression in the cam and a normally closed switch is, of course, one which is normally closed when the roller is in the depression in the cam.

The arrangement illustrated in Figs. 9–11 for the microswitch assembly is typical of all of the microswitch assemblies 177–182 designated in Figs. 4–8, and in Figs. 12A and 12B; Fig. 14A and Fig. 14B, and Figs. 16A and 16B, except that the number of cams and associated microswitches vary in accordance with the functions to be controlled as illustrated more clearly in Figs. 12A and 12B. In Figs. 12A and 12B, the relative positions of the limit switches with respect to the associated motors has been illustrated schematically.

The cams have been illustrated by designation L.S. and given individual numbers. Fig. 13 shows the assembly of controls for operating the in-feed and out-feed of conveyors 107 and 108. The in-feed conveyor is operated by a motor designated schematically at 187 in Fig. 13, while the out-feed pan conveyor 108 is controlled by a motor designated schematically at 188. The motors 187 and 188 have their circuits terminating in junction box 189 in which are terminal blocks including circuits which extend to the pan-operated microswitch L.S. #1 illustrated at position 183 adjacent the in-feed pan conveyor 107 and the four-way Asco valve 185 whereby the operation of the pan stops on the in-feed conveyor 107 is controlled according to the presence of loaded pans on the in-feed conveyor. Various 4-pole, 6-pole and 8-pole terminal blocks are shown in Figs. 12A, 12B, 13 and 16A–16B, and these blocks will be generally designated T wherever they appear. The delivery pan conveyor 108 has associated therewith a control switch L.S. #2 at position 184, which in conjunction with other means to be described, insures the automatic operation of the loading-unloading motor by the movement of pans over the actuator of L.S. #2 whereby conditioned pans are delivered from the proofer to the oven at a quantity rate dictated by the capacity receiving rate of the oven.

The control equipment is mounted on a control panel 190 exterior to the proofer as represented in Fig. 16A adjacent which the reset control station 191 is mounted; all wires in the wireway (see Figs. 12A and 12B) running directly to the control panel. Panel 190 contains the line switch, the control switch, seven motor starters, seven operating relays, four reset relays, four magnetic locking relays, two time-delay relays and an electronic timer. The equipment on the panel is represented in Figs. 16A and 16B which, when aligned, diagrammatically show the inter-relation of the several components of the control system. The elevator motor starter is shown at 192; the upper rack motor starter is shown at 193; the lower rack motor starter is indicated at 194; the lowerator motor starter is shown at 195 and the loader-unloader motor starter is shown at 196. The in-pan conveyor motor starter for motor 187 is illustrated at 197. The out-pan conveyor motor starter for out-pan conveyor motor 188 is shown at 198. These starters are of the conventional open magnetic type as will be observed.

An electronic timer 199 including an electron tube having a cathode, a control grid and an anode, arranged in an adjustable timer control circuit, is provided for adjusting the time of operation of the program system, in association with relays CR, CR1, TR, located on panels 200, 201 and 215 respectively, and a microswitch L.S. #15 which is located in microswitch assembly 177 (Fig. 8). The panel assembly also includes reset relays R4, R4A, R4B and R4C on individual panels 203, 204, 205 and 206 respectively. There are also provided latching interlocking relays, LR at position 208, LR1 at position 209, LR2 at position 210 and LR3 at position 211a. These relays lock the elevator, lowerator, upper rack conveyor, and lower rack conveyor respectively out of operation until closed by cam switches which close only when elements have reached or are in certain positions as will later be more specifically described. In addition to this equipment, the panel assembly also includes a relay ER1, a three-second Adlake timer relay in position 213a (see Fig. 16A) and a thirty-five second Adlake timer in position 213b. The panel assembly also includes the control circuit breaker 214A and the main line circuit breaker 214. The equipment is arranged in accordance with the circuit assembly shown in Figs. 16A and 16B and is adjusted and controlled from reset control station 191 which includes the cycle selector switch 220 and the reset-start button 221; the stop button 222; the in-pan conveyor control switch 224; and the out-pan conveyor control switch 225. The conductors lead from the control panel 190 to the several conveyor motors 145–149 and the in-feed and out-feed pan motors 187 and 188 through junction box 189 and are housed within conduits such as the wireway shown in Figs. 12A and 12B.

In the line diagram, Figs. 14A and 14B, the inter-relation of the several parts of the system hereintofore explained has been illustrated to make clear the coordination of the several limit switches and the manner in which the program is carried out. Similar reference symbols have been used to designate corresponding parts of the line diagram as those applied to the associated figures, and legends have been applied to different parts to clarify the operation thereof. The limit switches L.S. #11–L.S. #66 which are assembled in six multiple cam assemblies corresponding to Figs. 9–11, are referred to in Fig. 17 which depicts them in typical position as follows:

L.S. #11, 12, 13, 14, 15 _____ Indexing.
L.S. #21, 22, 23, 24, 25, 26 ____ Elevator.
L.S. #31, 32, 33, 34, 35, 36, 37 ___ Loader-unloader.
L.S. #41, 42, 43, 44, 45 _____ Lower rack conveyor.
L.S. #51, 53, 54 _____ Lowerator.
L.S. #61, 62, 63, 64, 65, 66 _____ Upper rack conveyor.

The cams in the limit switch assemblies 171 and 178 associated with the elevator motor, are shown in the top two rows in Fig. 17. The cams in the limit switch assembly associated with the loader and unloader motor 149 are grouped at 179 in Fig. 12A and illustrated in the third row from the top in Fig. 17. Similarly, the cams in the switch assembly associated with the lower rack conveyor are grouped at 182 in Fig. 12A and are shown in the fourth row from the top in Fig. 17. The cams in the limit switch assembly 181 associated with the lowerator are represented in the next to the last row in Fig. 17. The cams in the limit switch assembly 180 associated with the upper rack conveyor are illustrated in the bottom row in Fig. 17. The cam numbering and rotation are represented as seen in the terminal block side of the limit switch assembly illustrated in Figs. 9, 10 and 11. In each instance in Fig. 17, the actuating rollers for the microswitches are represented in relation to the peripheral recesses in the cams in the position in which they would be if each of the motors was in correct stop position.

When the unit to be controlled is in correct stop position, each cam will be set such that the peripheral recess is in the peripheral edge of the cam at a properly spaced distance circumferentially relative to the recess in the rollers associated therewith. Initial adjustment must be made of all of the cams to properly co-ordinate the electrical functions throughout the systems.

Referring back to Fig. 17, the functions of the several limit switches may be summarized as follows:

L.S. #2—Interrupts loader-unloader if pans are delayed on conveyor 108 and depress and open this switch.
L.S. #11—Starts loader-unloader (see 31).
L.S. #12—Stops elevator.
L.S. #13—Opens ER1 just before elevator stops (see 32) (elevator-loader-unloader interlock).
L.S. #14—Reset—permits the elevator to be restarted through reset button if the elevator has been stopped out of position before finishing a given cycle (R4C relay).
L.S. #15—Reactivates timer for next timing cycle.
L.S. #21—Starts lower rack conveyor as platform comes to position (see 41).
L.S. #22—Closes LR relay before upper platform on elevator comes into position opposite upper rack conveyor track 102 of lowerator (see 66).

L.S. #23—Locks out upper rack conveyor motor unless loader-unloader is in stop position. Special reset means for starting upper rack conveyor if loader-unloader is stopped on a seventh cycle.

L.S. #24—Closed when upper platform of elevator is in top position opposite track 102 (one interlock of 4 which activates the upper rack conveyor 24, 34, 54, 64).

L.S. #25—Opens when elevator is in top position (a reset to pick up elevator after shut down when L.R. is energized).

L.S. #26—Prevents elevator from running until lower rack comes into position (parallels LR3).

L.S. #31—Stops loader-unloader.

L.S. #32—Closes ER1 (series with timer contacts to start elevator) (see 13 and 15).

L.S. #33—Reset—starts loader-unloader through reset button when stopped out of position (R4 relay).

L.S. #34—Closes and opens just as the pans are pushed onto the rack before loader-unloader comes to stop position. (Completes circuit to start upper rack conveyor as loader-unloader completes its seventh cycle.) (See 24, 54, 64.)

L.S. #35—Resets ER1 when load-unloader is in stop position—proves loader-unloader is back in rest position. (This starts proofer through reset button after normal shut down.) (R4A.)

L.S. #36—An elevator interlock which is closed only when pusher bar is in correct stop position.

L.S. #37—Resets timer 199 after a temporary shutdown of the loader-unloader due to a pan delivery stoppage (see L.S. #2).

L.S. #41—Stops lower rack conveyor.

L.S. #42—Starts lowerator when rack moves off lower platform (through LR1—see 44).

L.S. #43—Reset—starts lower rack conveyor through reset button when stopped out of position (R4B relay).

L.S. #44—Closes LR1 relay, lowerator interlock—proves lower rack conveyor has run (see 52).

L.S. #45—Elevator interlock—lower rack conveyor 106 must be stopped in its correct position before this switch closes and permits starting of elevator.

L.S. #51—Stops lowerator.

L.S. #52—Opens LR1. Closes LR2 (upper conveyor interlock) (see 65).

L.S. #53—Reset—starts lowerator through reset button when stopped out of position (R4A relay).

L.S. #54—Closes when lowerator is stopped in position (see 24, 34, 64).

L.S. #61—Stops upper rack conveyor.

L.S. #62—Reset—starts upper rack conveyor through reset button when stopped out of position (R4B relay).

L.S. #63—Opens and closes before upper rack conveyor stops (shuts down proofer through cycle switch) (CR1 relay).

L.S. #64—Closed when upper rack conveyor is in correct stop position (see 24, 34, 54).

L.S. #65—Opens LR2 (see 52).

L.S. #66—Opens LR after rack clears elevator (see 22).

Thus, it will be seen that the microswitches associated with each of the motors also control, in part, the operation of associated motors as well as stop the operation of the motors which drive them and control, in part, the operation thereof. Further, various interlocking switches are provided which remain open to prevent the operation of various of the motors until various elements of the apparatus have reached or are in correct position for the operation to begin. These switches are associated with the latching relays LR, LR1, LR2 and LR3.

Summarizing the arrangement of the proofer installation, it will be observed that the machine is operated by five drive motors 145–149 with two driven conveyors 107—108 for in-feed and delivery of pans. The electrical functions are controlled by a main fused circuit breaker, control panel 190, six micro-timer control boxes (177–182) one safety switch LS3, and two pan-operated microswitches L.S. #1 and L.S. #2. The control panel 190, as noted, contains a line switch (214), a control switch (214A), seven motor starters (192–198), seven operating relays (CR, CR1, ER1, TR, UR, UR1 and PR1), four reset relays (R4, R4A, R4B, and R4C), four magnetic locking relays (LR, LR1, LR2 and LR3), two time delay relays (213a and 213b), and one electronic timer (199). The safety switch at position 186 (L.S. #3, Fig. 13) is located on the delivery conveyor 107 to the left front of the proofer and is connected mechanically to sense pan jams in or out of the proofer. The micro-timer control boxes are located by numbers as shown in Figs. 12A and 12B:

At numerals 177 and 178 limit switches #11 and #15 and #21 to #26 are on the elevator motor and drive platform, At numeral 179, limit switches #31 to #37 are on pusher drive platform, At numeral 182, limit switches #41 to #45 are on the lower rack conveyor drive platform, At numeral 181, limit switches #51 to #54 are on the lowerator drive platform, and At numeral 180, limit switches #61 to #66 are on the upper rack conveyor drive platform.

The pan-operated microswitch L.S. #1 to 183 (Fig. 13) is located on the in-feed pan conveyor 107 and microswitch L.S. #2 at position 184 is located on the delivery pan conveyor 108.

The limit switches #11, 21, 34, and 42 which start the loader-unloader motor 149, the lower rack conveyor motor 148, the upper rack conveyor motor 146, and the lowerator motor 147 respectively, are all normally closed switches, that is to say, the circuit is open while the contact rides on the cam and the circuit is made when the contact roller drops into the depression in the cam. Thus, these circuits close and are opened again almost immediately. Once the circuit is made to energize a coil in one of the motor starters and the armature plunger associated therewith is moved forwardly and makes the line circuit to the particular motor, a holding circuit is employed to maintain the motor in operation until its cycle is completed. This is best illustrated in Figs. 18–22 which depict the circuits controlling the various motors in somewhat more detail than in Figs. 14 and 14B and 16A and 16B. In Figs. 18–22, the motor starters are shown in greater detail than in Fig. 16B and likewise, the latching relay LR1 which actually has a magnetizing and demagnetizing coil wound around a common pole (Fig. 16A) is depicted as having separate coils for making and breaking the contacts in the interests of greater clarity.

In the various figures, a symbol comprising vertical parallel lines is employed to denote normally open contacts in one of the relays and similar parallel lines which are crossed denote normally closed contacts in these relays.

In Fig. 18, the elevator motor 145 is shown with its controlling circuits, the line wires being L1, L2 and L1X (the latter connecting into the wire L1). The motor starter coil is represented diagrammatically at 192A, and its plunger 192a has contacts 192b and a contact 192c thereon. The latter contact 192c is adapted to engage the hold contact 226 and the contacts 192b to engage the motor contacts 192d to connect the motor with a source of power, the terminals 192b, of course, being connected to the line wires L1, L2, and L3, although these connections are omitted from the view.

When the start and reset button 221 is actuated to start the proofer, relay CR1 is energized contacts CRa thereof close and the tube in the timer is energized through limit switch 15. After the predetermined time has elapsed, contacts TC in the timer close and the elevator starts through the normally closed limit switches L.S. 36, L.S. 45, the contacts LRe, LR3a, and ER1a of relays LR, LR3 and ER1 respectively, and the lower rack auxiliary interlock 227. If any of these are "open" the elevator cannot, of course, be started. The latching relays employed throughout, and I here have reference particularly to LR, LR1, LR2 and LR3, are double throw relays in which pairs of contacts are normally open and other pairs are normally closed, a relay of this type being indicated in a more detailed schematic manner in Fig. 21. The functions of the limit switches and relays shown in Figs. 18–22 have been indicated and as has been observed, many of them function as checks to prevent the operation of the various motors unless various elements of the proofer are in proper position for the operation to start and/or continue. Once the timer contacts TC are made, the motor starter, coil 192A is, of course, energized, which causes the plunger 192a to move and make the contacts 192b and 192d to start the elevator motor 145. The timer contacts, of course, will close only momentarily, but since the circuit through contacts 192c and 226 is also made when the plunger 192a moves forwardly and normally open limit switch 12 is closed, the coil 192 remains energized, thus maintaining the plunger 192a in advanced position. The circuit is broken when the contact roller of limit switch 12 falls into the depression in the cam and thus opens the holding circuit to break the contacts 226 and 192C. Thereafter, the elevator motor cannot again be energized until the timer contacts are closed once again, except if the motor 145 is stopped before it has completed its normal cycle. In the latter case, the reset button 221 can be actuated to restart the elevator and complete the elevator cycle. The resetting circuit may be made through the closed stop button 222, LS3, LS14 and relay R4C, or through L.S. 25 and the closed contacts of the normally open terminals LRd of relay LR if relay TR is closed. In either case, the motor coil 192A is energized to start the motor again and the circuit is held through contacts 192c and 226 and limit switch 12 as noted. The limit switch 14 which is in the limit switch assembly 177 driven by the elevator motor 145 is a normally open switch and accordingly the reset button 221, if depressed after the cycle of the elevator was completed, would not start the motor 145.

In Fig. 19, I have shown similar control circuits for the loader and unloader motor 149. Here, the normally open limit switch 2 permits energization of the coil 196a in motor starter 196 provided the coil 228 of relay UR is energized to make the contacts 229 and 230, and 231 and 232. The motor starter coil 196a is energized to make the contacts 233 (which are, of course, connected to the line wires L1, L2 and L3) and motor contacts 234, to thus start the motor. When the contact roller of normally closed limit switch 11 falls into the depression in the cam associated therewith to energize the coil 228 and permit starting of the motor, the hold contacts 235 and 236 close for a time to complete the cycle of the loader-unloader and then stops the motor 149 by opening and breaking the circuit. If the loader-unloader motor is stopped before it has completed a cycle, it can be restarted by pressing reset button 221 which energizes relay R4, thus making the line to the coil 196a. To permit this, normally open limit switch 33 must, of course, be closed as it is during the cycle of the loader-unloader. The relay UR as depicted is typical of the other operating relays.

Fig. 20 shows the circuits controlling the lower rack conveyor motor 148, and in this instance the circuitry pattern is perhaps represented in simplest form. The motor starter coil 194a has a plunger 194b making the contacts 237 (which, of course, connect to line wires L1, L2 and L3) and the motor contacts 238. The hold contacts 239 and 240 are also made when the normally closed limit switch 21 (in the assembly 178 driven by the elevator motor) is closed to energize the coil 194a. The limit switch 21 immediately breaks or opens; however, the coil 194a similarly remains energized through the hold contacts 239 and 240 and normally open limit switch 41 which is closed. The latter switch opens when its contact roller drops into the depression in its cam to stop the motor 148 when it has completed its cycle. If the lower rack conveyor motor 148 is stopped before it has completed a cycle, it can be restarted by pressing the reset button 221 which energizes and closes R4B and accordingly the coil 194a assuming the limit switch 43 is in closed position. The latter switch, which is in the assembly 182 driven by the motor 148 will, of course, be in closed position only during the cycle of the lower rack conveyor and will open when the limit switch 41 opens.

In Fig. 21, the circuits controlling the lowerator motor 147 are shown, and a latching relay LR1 which is typical of all the latching relays employed, is illustrated schematically in more detail. The motor starter coil 195a similarly has a plunger 195b making the contacts 241 (which are connected to line wires L1, L2 and L3), and the motor contacts 242. Hold contacts 243 and 244 are also made when the normally closed limit switch 42 is closed so that the coil 195a remains energized when the limit switch 42 opens. In order for this circuit to be made so that the motor 147 will start, the limit switch 44 must be closed to energize the coil 245 in the relay LR1 and close the contacts 246 and 247 in the relay LR1, the latter being closed through the limit switch 44 which proves the lower rack conveyor runs. Although the limit switch 42 immediately opens, the limit switch 51 is closed and the circuit through the contacts 243 and 244 continues to energize the coil 195a until the limit switch 51 opens to stop the motor. The reset relay R4A will be energized when the button 221 is pressed to energize the coil 195a and restart the motor 147 if its operation has been interrupted, provided the limit switch 53 is closed. Limit switch 52, when closed, will permit coil 248 in the relay LR1 to be energized and break the contacts 246 and 247.

The upper rack conveyor motor 146 which drives switch assembly 180 is shown in Fig. 22. Starter limit switch 34 which closes and opens again immediately energizes the circuit to the motor starter coil 193a provided the limit switches 24, 54 and 64 and the N.O. contacts LR2a in relay LR2 are closed. The starter coil plunger 193b accordingly makes the contacts 249 (which connect to line wires L1, L2 and L3), and the motor contacts 250. Hold contacts 251 and 252 which are also closed by L.S. #34 maintain the coil 193a energized through closed limit switch 61 which also stops the motor 146 when it opens. If the motor 146 is stopped prior to the time limit switch 61 opens, relay R4B will be energized and closed when the reset button 221 is pressed and will energize coil 193a to start the motor 146 again provided limit switch 62 is closed.

The functions of the various operating relays will be apparent. ER1, for example, is an interlock relay for the elevator whose contacts are open while the loader-unloader motor is operating so that the elevator motor cannot operate simultaneously therewith. TR is a relay which is open during normal operation but may be closed by L.S. 37 or L.S. 2 to reset the timer 199 if the loader-unloader motor 149 has been stopped by pans backing up from the oven to a point where they hold down L.S. 2. UR is a relay which is closed during operation of the loader-unloader motor 149 and open when the latter is not operating. The motor 149 is stopped due to opening of the pan operated L.S. 2 by a pan jam and when L.S. 2 is closed after the pans have cleared it, the motor immediately is restarted since relay UR has remained closed.

Relay CR provides a means for cutting out the entire control circuit if either the stop button 222 is pressed or the unloader safety switch L.S. 3 is opened to break the CR hold contacts CRa. Relay CR1 provides a means for cutting out certain controls when the selector switch is moved from the automatic to the cycle position, thus opening the circuit 6 and breaking the CR1 contacts CR1a. The selector switch is pressed at the end of the day when the last rack is being unloaded. When limit switch 63 opens and drops out CR1, the loader and unloader may have to complete its operation or the upper rack conveyor may have to move a few inches more so that the line L1X is brought around parallel to line L1. The proofer will cease operation when the cycle of a given rack has been completed such that it is completely unloaded and the various elements will be in position to resume operation the next day.

Relay PR1, when closed upon the closing of pan operated L.S. #1, will activate the Asco air valve PS1 at position 185 to raise a pan stop and prevent pans from moving into loading position until the proper time.

Relay UR1 at position 212, Fig. 16A, duplicates in action relay UR in the sense that it is in parallel therewith and its contacts are held except when the loader-unloader motor is not supposed to be in operation. UR1 functions in series with relay PR1 to operate the "In-Conveyor" (107) pan stops, C and D (see Fig. 3).

The latching relays LR, LR1, LR2 and LR3 provide means for preventing operation of the elevator, lowerator, upper rack conveyor and lower rack conveyor respectively until the closing of certain "checking" or "proving" limit switches which indicate that the other associated elements are in correct position for the operation to begin. Figs. 14A and 14B and the table of switches and their functions previously noted, illustrate the operation of these relays. The numerals indicating the various wires or lines in Figs. 14A and 14B are also used in Figs. 16A and 16B to aid in identifying the various circuits.

The proofer will start, after the main circuit breaker, control panel line switch, and control circuit switch are closed by manual operation of the "reset-start" button 221. A signal bell will sound and a light will come on when the control circuit switch is closed and will remain on until the proofer starts. The proofer will be stopped by: cycling out through the cycle position of the "Cycle-Automatic" button 220 which is the correct method of stopping the proofer; manually operating the stop button 222; an emergency shutdown through the safety switch L.S. 3, when a pan remains on L.S. #2 in position 184 as the pusher 109 starts (the proofer restarting automatically when the switch is cleared); when there is a shear pin breakage on any of the conveyors or conveyor motors; when there is an overload out; (see the overload relay circuits O.L. 14A); when there is a timer (199) failure; when there is a failure of relays ER1, LR, LR1, TR, UR and UR1 at positions 202, 208, 209, 210, 215, 211 and 212; and, of course, when there is a main circuit failure.

Summarizing the operation of the proofer briefly, with the cycle selector switch 220 in the automatic position, assume that the rack 111 has stopped with its fifth shelf in neutral position (between the conveyors 107 and 108), the loading of its fourth shelf and unloading of its sixth shelf having been completed. Pressing re-set button 221 causes the elevator 105 to raise the fifth shelf of rack 111 one index to the loading position shown in Fig. 2. Just before the elevator 105 stops, the loader-unloader motor 149 is started to load the fifth shelf of rack 111 and unload the seventh shelf thereof. Just before the loader stops, the elevator interlock relay is closed as represented at position ER1 in the line diagram Fig. 14B. The timer 199 is reset after each elevator index by the limit switch 15 which opens and closes just before the elevator starts. The elevator is energized by the timer contact which causes the racks to index to the next position and then the loader-unloader operates again. The rack 125 was, of course, maintained on the track 103 prior to the time that the rack 111 raised to clear it. It was during this index period that the lower rack conveyor 106 was energized and moved rack 125 onto the elevator bracket 105a. At this time, also, the rack 119 was in the space occupied by the rack 118 in Fig. 2. As soon as the lower rack conveyor 106 moved the rack 119 over when it operated to move the rack 125 to the elevator 105, the lowerator latching relay LR1 was closed and just before the lower rack conveyor 106 stopped, the lowerator 104 started and lowered a rack (shown at 118) from the upper rack conveyor 101 to the position adjacent the conveyor 106. Just before the lowerator 104 stopped, the upper rack conveyor latching relay interlock LR2 was energized and the lowerator latching relay interlock LR1 was de-energized.

After the fifth shelf is loaded and the seventh shelf is unloaded, the elevator indexes to a new position in which the sixth shelf of rack 111 will be loaded and the first shelf of rack 125 unloaded. Just before the elevator 105 raises the rack 111 to its top position, the elevator latching relay LR is energized, loader-unloader 149 operates and when the loader bar 109 returns, upper rack conveyor 101 moves the loaded rack 111 from the elevator.

Before the upper rack conveyor 101 stops, the elevator latching relay LR is de-energized and elevator 105 starts operating again. Also, before the upper rack conveyor 101 stops, upper rack conveyor latching relay LR2 is de-energized.

This operation will continue as long as desired. When the last pans are about to be unloaded from the proofer at the end of the day, the selector switch 220 is moved to "cycle" position so that the proofer will stop in correct position to be loaded for the next day's run. After the proofer stops, the stop button 222 is pressed to de-energize the remainder of the control circuit.

From the main duct or wireway leading from the panels 190 and 191, a conduit is dropped to each limit switch assembly and from the latter conductors lead, of course, to each motor.

Wires L1B, 42, 43, 45, 53, 5T, $5T_2$, and $5T_3$, lead to the limit switch assembly 182. Wires L1B, L1B, 5, 7, 20, 21, 25, 27, 29, 31, 41, 65, 66, 69, and 3T, $3T_2$, $3T_3$ lead to the limit switch assemblies 177 and 178. Wires L1B, L1X, 20, 26, 28, 32, 33, 64 and 65, and 4T, $4T_2$, $4T_3$ lead to the assembly 179; wires L1B, L1X, 6, 55, 62, 67, 68, 71 and 1T1, 1T2, 1T3 lead to the assembly 180; wires L1B, 52, 54, 56, 66, 67 and 2T1, 2T2, 2T3 lead to the assembly 181, and wires L1B, L2B, L1X, 1, 2, 12, 13, 14, 15, and 6T1, 6T2, 6T3, 7T1, 7T2 and 7T3 lead to the junction box 189.

*Electrical operation*

When the main line circuit breaker 214 and control circuit breaker 214A are closed, the circuit to the timer tube filament in the timer 199 will be energized immediately and the control circuit light 300 will light. With the selector switch 220 set on "automatic" position, the "reset" button 221 is pressed to energize the control relays CR at position 200 and CR1 at position 201, thus closing contacts CRa and both N.O. contacts of CR1. When the relay CR1 at position 201 closes and the tube in the timer 199 has closed contacts TC after a predetermined interval, the normally open contacts ER1a of relay ER1 at position 202 are closed through limit switch 35 and the normally open contacts R4Aa of reset relay R4A at position 204 close, to energize the ER1 relay coil at position 202 (providing the loader-unloader has stopped in its "out" position) and close the hold contacts ER1b. When the button 221 is pressed, CR, CR1, TR, ER1 relays at position 200, 201, 215 and 202 should pull in and hold and R4, R4A, R4B relays at positions 203, 204, 205 should pull in and drop out as the button is pushed and released. When a pre-set time has elapsed, the timer contacts TC close to energize the elevator magnetic switch 192A through L1B, limit switch 36, N.C. contacts LRe of latching relay LR at position 208, normally open contacts ER1a of relay ER1 at position 202, and the normally open contacts TC of timer 199 to the elevator magnetic switch 192A which is held through elevator holder and limit switch 12. Just before the elevator 105 is stopped in indexed position by the limit switch 12, limit switch 11 closes and opens to start the loader-unloader 149 which is held through loader-unloader holder finger 235 and limit switch 31. Also, the holding contacts ER1b of elevator relay ER1 at position 202 are dropped out by limit switch 13 just before the elevator 106 is stopped in correct loading position by the limit switch 12. The loading and unloading pusher bars 109 and 110 respectively which are driven by the motor 149 should be moved through a complete stroke while the elevator is at rest.

Just before the loader-unloader motor 149 stops, limit switch 32 closes and opens, thus picking up contacts ER1a of relay ER1 at position 202. Then the limit switch 31 stops the loader-unloader motor 149 with the loader and unloader bars in the out position shown in Fig. 2. At a preset interval thereafter, the timer 199 times out, closing timer contacts T.C. and elevator 105 indexes to the next shelf.

The elevator 105 and loader-unloader 109—110 continue operation until just before the rack 111 reaches its upper position. When limit switch 22 closes and opens energizing contacts LRa of elevator latching relay LR at position 208, the elevator starting circuit is broken until rack 111 is moved by upper rack conveyor 101. The upper rack conveyor 101 is interlocked by the several limit switches and contacts LR2a of upper rack conveyor latching relay LR2 at position 210. When limit switches 64, 54, 24 and LR2a at position 210 are closed and just before the loader-unloader motor 149 is stopped on its 7th index relative to rack 111, limit switch 34 closes; then the upper rack conveyor 101 magnetic switch 193a closes and is held by its finger 252 and limit switch 61. After the upper rack conveyor 101 starts and the rack clears the elevator 105, limit switch 66 closes and opens the contacts LRb of the elevator latching relay LR at position 208 to allow the elevator 105 to continue operation. While the rack 111 was being moved onto the track 102, the rack 117 was, of course, being moved onto a platform or bracket 105a carried by the lowerator 104. Just before the upper rack conveyor 101 stops, the limit switch 65 closes and opens, dropping out the contacts LR2b of the upper rack conveyor latching relay LR2 at position 210. The elevator 105 and loader-unloader 109—110 continue operation until the rack 125 is sufficiently enough to clear the lower rack area. At this point, limit switch 21 closes and opens to energize the lower rack conveyor 106 magnetic switch 194a which is held through its holder finger 240 and limit switch 41 and brings the succeeding rack 124 into the elevator 105 at the same time the rack 118 is, of course, moved onto the track 103. It is necessary to close and open two limit switches in sequence just before the lower rack conveyor 106 is stopped by L.S. #41. The first limit switch to close and open is L.S. 44, which energizes lowerator latching relay LR1 through contacts LR1a at position 209. The second switch to close and open is L.S. #42 which energizes the lowerator magnetic switch 195a and starts the lowerator 101. The coil 195a remains energized through its holder contact 240 and limit switch 51. Just before the descending lowerator 104 is stopped by limit switch 51 with rack 117 in the space previously occupied by rack 118, limit switch 52 closes and opens, which opens lowerator latching relay LR1 through contacts LR1b at position 209 and closes contacts LR2a of the upper rack conveyor latching relay LR2 through contacts LR2c at position 210. With the selector switch 220 in "automatic" position limit switch 63 is by-passed and the entire above operation continues to repeat. If the selector switch 220 had been in "cycle" position, limit switch 63 would open and drop out both N.O. contacts CR1a and CR1b by deenergizing the coil of relay CR1 at position 201 and the operation would stop. Another rack could then be cycled by pressing "reset" button 221.

The latching relays, one of which is shown particularly in Fig. 21 (LR1) operates as follows: The limit switch has to make the contact long enough to allow the auxiliary contact in series with the closing or magnetizing coil to break before the limit switch opens its contact. The principle of this relay is that the auxiliary contacts break at the moment of maximum flux in the magnetic frame, which causes the frame to be magnetized and thus hold the contacts latched. The magnetism created does not decay with time and the relay remains closed indefinitely or until it is dropped out by the opening or demagnetizing coil which demagnetizes the previously magnetized frame.

It is important that the depressions in the resetting limit switch cams for the various elements are set exactly in alignment with the depressions in the respective stopping cams of the elements and in coordination with the designed holding interval of the respective starting cams in such a manner that the combination of switches L.S. 12, L.S. 14 and the timer contacts 199; L.S. 11, L.S. 31, L.S. 33; L.S. 21, L.S. 41, L.S. 43, L.S. 42, L.S. 51, L.S. 53; and L.S. 34, L.S. 61, L.S. 62 insure restarting through the reset circuits at any position outside of the normal stop positions of the various elements.

Setting the selector switch 220 in "cycle" position is useful when washing racks or for maintenance purposes, and for stopping the machine in correct position for loading complete racks. When all the pans are out of the proofer, the selector switch 220 is turned to "cycle" and the rack will stop in correct position to load for the next day.

*Reset circuit*

As has been noted, the purpose of the relays R4, R4A, R4B and R4C is to pick up the operation in sequence when: the stop button 222 is pressed in an emergency; one of the overload relays O.L. kicks out thus stopping the machine, or there is a power failure which stops the machine. All of the reset relays are energized any time the reset button is pressed, except R4C at position 206, whose operation will be presently explained.

If the proofer has been stopped and any of the operations have started but have not finished their normal cycle, the particular holding and stopping limit switch (12, 31, 41, 51 or 61) which is closed during the normal cycle and opened only when a particular unit has finished its cycle, will be in closed position. When the reset button is pressed, the particular reset switch (14, 33, 43, 53 or 62) will be closed if the cycle of operations has not been completed and a finger of the particular reset relay closes the circuit to start the respective units in proper sequence as if the stoppage had not occurred.

The limit switch 14 allows reset relay R4C at position 206 to operate only when the elevator is stopped between shelves. In order to start the elevator 106 when this condition occurs, the limit switch 35 and R4Ab contacts of relay R4A at position 203 closes the relay ER1 (ER1a, ER1b). The finger R4Ca of the relay R4C at position 206 parallels the timer contacts and restarts the elevator 105.

The loader-unloader motor 149 as noted is started by L.S. #11 through contacts or fingers URa of relay UR just before the elevator stops. Relay UR holds through and is opened by limit switch #31. In the event the motor 149 stops through power failure or emergency shut down, the motor is started by resetting relay UR through the reset button 221 through limit switch #33 and contacts R4a of relay R4. In the event pans are on L.S. #2 when the pusher or loader 109 starts, it is stopped by L.S. #37 until the pans clear L.S. #2 and then automatically starts through relay UR.

In the event the motor 148 (which starts through cam #21 just as the platform 105a of elevator 105 comes into position, holds through and is stopped by cam #41) stops through power failure or emergency shut down, it is started by reset button 221 through cam #43 and contacts R4Ba of relay R4B at position 204.

As noted, the lowerator motor 147 starts through cam #42 in series with contacts 246, 247 of relay LR1 at position 209, holds through, and is stopped by L.S. #51. Relay LR1 at position 209 is closed by cam #44 through contact LR1a just as the lower rack clears the bottom of the lowerator platform 105a. In the event the motor 147 stops through power failure or emergency shut down, it is started by reset button 221 through cams #53 and contacts R4Aa of relay R4A at position 203.

As noted, the upper rack conveyor motor 146 is started by cam #34 just after the pusher member 109 loads the bottom shelf of the rack, through cams #24, #54, #64 and contacts LR2a of relay LR2 at position 210. Relay LR2 at position 210 is closed by L.S. #52 through contacts LR2c just before the lowerator 104 stops and is opened by cam #65 just before the upper rack conveyor 101 stops. The motor 146 holds through and is stopped by L.S. #61. The upper rack conveyor motor may be restarted through L.S. #62 and contacts R4Bb after a power failure or emergency shutdown. When current is lost just when limit switch 34 is making as the pusher 110 is returning to its out position, then the upper rack conveyor 101 would not start because the limit switch 62 is still open. To overcome this, an LR contact LRc, an R4 contact R4b, and L.S. 23 are incorporated parallel to the limit switch 34 which will start the upper rack conveyor 101.

With conveyor selector 224 in the "on" position, the loading conveyor 107 operates. A three-second Adlake relay 213a is connected in parallel with the coils of relays UR and UR1 in the loader-unloader circuit as shown in Fig. 14B. The Adlake relays are conventional timing relays having movable mercury tube switches where the circuit is broken after three seconds due to the mercury's leaking to an opposite end of its tube. Pan sets are measured off between a pan stop C and a pan stop D (Fig. 3) in which is termed a "measuring space" therebetween prior to the time they are admitted to the loader space or area adjacent the loader bar 109 and between the stop D and fixed stop E. Assuming that the pan stop C is down as in Fig. 3, permitting the pan sets to enter the measuring space and the stop D is up preventing their admittance to the loader area, if the pan sets entering the measuring area depress pan-operated limit switch 1 which is disposed just outwardly of the pan stop D within three seconds of when the loader-unloader stops, the pan stop lowers to allow the pans in the measuring space to enter the loading area and simultaneously the pan stop C raises to prevent pans from entering the measuring space. The pan stops remain in these positions until the last pan moving into the loader area clears LS1. Then the pan stops C and D return to original position to allow a new group of pans to enter the measuring space.

The in-conveyor pan stops for in-pan conveyor 107 are operated by a four-way Asco pneumatic valve 185 which is energized through contacts PR1a of relay PR1. The coil of PR1 is energized by L.S. #1 on in-feed conveyor 107 through contacts of Adlake in series with N.C. contacts of UR1. The contacts PR1b are hold contacts. Adlake timer 211 is energized by L.S. #11 during the load-unload cycle and its contacts remain closed for three seconds after UR and UR1 are dropped out by L.S. #31. The stops will not permit pans to enter the loader space unless LS1 is closed within three seconds after the pushers 109—110 return to rest position and these pans cannot enter the loader area if the previous pan sets have not cleared this area. LS1 must be closed within three seconds after the loader-unloader stops, since the time remaining during the indexing of the elevator is required for the pans to move from the measuring space into the loading area. With the unloading conveyor selector switch 225 in the "on" position, the unloading conveyor 108 will operate continuously.

Limit switch #2 on the conveyor 108 stops the pushers 109 and 110 just after starting of the motor 146 if pans are on the switch L.S. #2, and the pushers 109—110 start automatically as soon as pans move from the switch. A warning bell sounds after 35 seconds delay. Limit switch #3 on the front side of the outpan conveyor 108 provides a safety which drops out the proofer control circuit. It is opened by malpositioning or jackknifing of the pans on pan conveyor 108 within the proofer.

Various safety means are provided to handle loading and unloading jams. If the pans back up from the oven to a point where they hold limit switch 2 down, the loader-unloader motor will be stopped until the pans move off the switch and will then restart automatically. Limit switch 3 is mounted on the unloader conveyor 108 with a cross wire W to operate it. If there should be pans on the conveyor and more pans are pushed out onto the conveyor, the pans will hit the wire, stopping the proofer completely. Pans will have to be cleared away before the "reset" button is pressed and the proofer is restarted.

The elevator 105 also has special circuits for handling various conditions. If through some malfunction the pushers 109—110 should operate while elevator 105 is in motion, the motor 145 will be stopped by L.S. #36. Therefore, cam #36 must be closed before the elevator will operate and this cam closes the switch only when the pusher is in correct stop position. In the event the elevator 105 should stop near top position (after LR at position 208 is closed) it is started through button 221, cam #25 and contacts LRd. The limit switch #25 must be open in top position so that the elevator 106 is locked out of operation by opened contacts LRe of relay LR until the upper rack conveyor moves the rack off the elevator platform. LR relay at position 208 is closed by the cam #22 as the rack nears top position and is opened by cam #66 after the rack moves off the platform.

There is an auxiliary interlock on the lower rack conveyor motor starter 194 in series with the timer 199 contacts which prevents the starting of the elevator motor while the lower rack motor is running.

After a pusher (loader-unloader) delay action, relay TR at position 215 is energized by cam #37 and L.S. 2 resets the timer 199 when the pan clears L.S. #2. If the lower rack 105 stops out of position, the microswitch #45, on the lower rack conveyor 105 in series with the timer contacts, prevents the elevator 106 from starting.

L.S. #23 prevents the upper rack 101 from starting through the reset button 221 after an emergency shutdown during the pusher cycle. This is to insure completion of loading before the upper rack 101 moves. L.S. #63 stops the proofer for normal shutdown through the cycle position of the "Cycle-Automatic" switch 220.

The lights and alarms referred to have not been designated by numeral inasmuch as they form no part of the invention, and it is believed that an inspection of Figs. 14A–14B and 16A–16B will readily determine which lights or alarms are referred to in the descriptive matter. A pilot lamp is connected across each set of overload relays O.L. If an overload relay O.L. should be kicked out, its pilot light will light showing which reset button should be pressed to reset the unit which has kicked out.

The operation of the proofer has been found to be highly efficient in carrying out baking operations on a mass production scale at relatively low cost, and although the invention has been described in certain preferred embodiments, it is realized that modifications may be

What we claim is:

1. A proofer comprising a housing enclosing an upper rack conveyor, a lower rack conveyor, an elevator, a lowerator, a loader and unloader mechanism associated with said elevator, a driving motor individual to each of said conveyors, said elevator, said lowerator, and said loader and unloader mechanism, and means individual to each of said driving motors and driven thereby for operating said driving motors in sequential timed relation, said means individual to each of said driving motors controlling both the motor individual thereto and also one of the associated motors in a predetermined program of operations.

2. A proofer as set forth in claim 1 in which the driving motor individual to said elevator is equipped with an additional means for controlling the operation thereof in coaction with the aforesaid means individual to said motor for operating said driving motor in sequential timed relation.

3. A proofer as set forth in claim 1 which includes re-cycling means for repeating the operation of said motors in sequential timed relation.

4. A proofer as set forth in claim 1 which includes reset means for restarting the operation of the aforementioned means at the same point in the cycle of said driving motors when the same have been stopped prior to completing the normal cycle of operations.

5. A proofer as set forth in claim 1 in which the means individual to the driving motor for said elevator comprises two coacting units one of which controls the vertical indexing of said elevator and the other of which controls the sequential operation of said elevator in relation to the periods of operation of said individual motors.

6. A proofer as set forth in claim 1 in which said means include groups of limit switches where each group of limit switches is actuated by a rotatably driven multiple cam shaft operated by the individual motor associated with the group of limit switches and wherein the cams on said cam shaft are selectively set to operate the associated limit switches, in sequential relation, certain of said limit switches, in each group, being connected to operate the motor with which the individual group of limit switches is associated and others of said limit switches in said group being connected to operate others of said motors.

7. A proofer as set forth in claim 1 in which said means include groups of limit switches where each group of limit switches is actuated by a rotatably driven multiple cam shaft operated by the individual motor associated with the group of limit switches and wherein the cams on said cam shaft are selectively set to operate the associated limit switches, in sequential relation, certain of said limit switches, in each group, being connected to operate the motor with which the individual group of limit switches is associated and others of said limit switches in said group being connected to operate others of said motors, and means for restarting the operation of said groups of limit switches subsequent to any complete cycle thereof and after a stoppage thereof.

8. A proofer as set forth in claim 1 in which said means include groups of limit switches where each group of limit switches is actuated by a rotatably driven multiple cam shaft operated by the individual motor associated with the group of limit switches and wherein the cams on said cam shaft are selectively set to operate the associated limit switches, in sequential relation, certain of said limit switches in each group being connected to operate the motor with which the individual group of limit switches is associated and others of said limit switches in said group being connected to operate others of said motors, and means for individually adjusting each of said limit switches with respect to the individual associated cam whereby the relative timing of operation of the several limit switches may be controlled within precise tolerances.

9. A proofer as set forth in claim 1 including a main power circuit and interlocks for certain of said driving motors for insuring the independent operation of said motors through a predetermined cycle of operation and preventing simultaneous operation thereof during the same cycle while the circuits leading to said motors are all activated from said main power circuit.

10. A proofer as set forth in claim 1 in which multi-shelf racks are progressively moved through said proofer by said elevator, said conveyors and said lowerator and additional means individual to the driving motor associated with said elevator for indexing the multi-shelf rack step-by-step and shelf-by-shelf from a position on said lower rack conveyor to a position on said upper rack conveyor.

11. A proofer as set forth in claim 1 in which multi-shelf racks are progressively moved through said proofer by said elevator, said conveyors and said lowerator, additional means individual to the driving motor associated with said elevator for indexing the multi-shelf rack step-by-step and shelf-by-shelf from a position on said lower rack conveyor to a position on said upper rack conveyor, and separate means associated with said loader and unloader mechanism for activating said mechanism when said elevator is indexed to predetermined positions in alignment with said loader and unloader mechanism.

12. A proofer as set forth in claim 1 which includes an in-pan conveyor and an out-pan conveyor associated with said elevator for delivering and receiving loaded pans with respect thereto, a plurality of multi-shelf racks adapted to be progressively moved through said proofer by said elevator, said conveyors and said lowerator, means for indexing said racks sequentially step-by-step and shelf-by-shelf on said elevator for aligning the shelves thereon successively with said in-pan and out-pan conveyors, and means for activating said loader and unloader mechanism while the shelves of said racks are in position for loading and unloading loaded pans from and to said in-pan and out-pan conveyor.

13. A proofer as set forth in claim 1 which includes an in-pan conveyor and an out-pan conveyor associated with said elevator for delivering and receiving loaded pans with respect thereto, a plurality of multi-shelf racks adapted to be progressively moved through said proofer by said elevator, said conveyors and said lowerator, means for indexing said racks sequentially step-by-step and shelf-by-shelf on said elevator for aligning the shelves thereon successively with said in-pan and out-pan conveyors, means for activating said loader and unloader mechanism while the shelves of said racks are in position for loading and unloading loaded pans from and to said in-pan and out-pan conveyors, separate motors for driving said in-pan and said out-pan conveyors, and limit switch means in contact position with the loaded pans on said in-pan conveyor controlling the quantity of entering pans and their time of entrance.

14. A proofer as set forth in claim 1 in which said means includes limit switch assemblies associated with each of said motors where each assembly of limit switches is actuated by a rotatably driven multiple cam shaft operated by the individual motor associated therewith and wherein the cams on said cam shaft are selectively set to operate the associated limit switches, a normally closed starting switch for said loader-unloader motor, upper rack conveyor motor, lowerator motor, and lower rack conveyor motor each mounted on a cam shaft other than the cam shaft associated with the limit switch assembly of the motor it starts, circuits for said starter switches connected to a source of power and to said motor, circuits in parallel with said starter circuits, a normally open limit switch mounted on the cam shaft associated with the limit switch assembly of the motor it controls provided in said last-mentioned circuits for holding said motor in operation and opening after a predetermined interval to stop operation of said motors at the completion of their cycles, and reset circuits also connected to said source of power and motor and in parallel with said starter circuits and circuits for said holding and stopping switches, said restarting circuits having normally open switches therein each timed with said stopping switches and mounted on the cam shaft associated with the limit switch assembly of the motor it restarts, said restarting circuits also having normally open restart relays therein, a common circuit connected to said relays including a restart switch for energizing the same to close them, and means for operating said elevator motor in timed relation with the other motors.

15. Proofer apparatus and the like for moving a series of racks having shelves adapted to carry bread pans through a continuous circuit comprising: an upper rack conveyor means and a lower rack conveyor means spaced therefrom; an elevator means and a lowerator means servicing said upper rack conveyor means and lower rack conveyor means at the ends thereof and operating sequentially with respect to said upper rack conveyor means and lower rack conveyor means; a separate motor driving at least two of said means which move in sequence; circuits for said motors connectable to a power source; and a control mechanism having actuating means driven by one of the separate motors, and circuit making and interrupting means connected in said circuits operated by said actuating means for operating said motors in sequential timed relation, said control mechanism controlling both the motor which drives its actuating means and also the motor driving the next of the means to move in sequence.

16. Proofer apparatus and the like for moving a series of racks having shelves adapted to carry bread pans through a continuous circuit comprising: an upper rack conveyor means and a lower rack conveyor means spaced therefrom; an elevator means and a lowerator means servicing said upper rack conveyor means and lower rack conveyor means at the ends thereof; means adjacent one of said elevator means and lowerator means for removing and replacing bread pans on the shelves of said racks; a separate motor driving at least two of said means; circuit means for said motors connectable to a power source; and a control mechanism in said circuit means having actuating means operated by one of the separate motors, and circuit making and interrupting means connected in said circuit means operated by said actuating means for operating said motors in sequential timed relation, said control mechanism controlling both the motor which operates its actuating means and also another motor for operating another of said means.

17. Proofer apparatus for moving a series of racks having shelves for carrying bread pans through a continuous circuit comprising: an upper rack conveyor; a lower rack conveyor vertically spaced thereunder; an elevator and a lowerator servicing said upper rack conveyor and lower rack conveyor at the ends thereof; means adjacent one of said elevator and lowerator for removing and replacing bread pans on the shelves of said racks; a separate motor driving each of said elevator, lowerator, lower rack conveyor, and upper rack conveyor; circuits for said motors connectable to a power source; a switch assembly mechanically coupled to each of said motors having engaging and disengaging switch contact means in said circuits and an operating shaft driven by the particular motor for causing engagement and disengagement of said switch contact means; one of said switch assemblies coupled to one of said elevator and lowerator having switch contact means for starting and stopping said one of said elevator and lowerator, and also means for starting one of the upper rack conveyor and lower rack conveyor motors so that said one of said elevator and lowerator can be operated through a predetermined number of indexing movements prior to starting said one of said upper rack conveyor and lower rack conveyor motors.

18. The combination defined in claim 17 in which each switch assembly has normally open engaging and disengaging reset switch contact means for starting the motor driving the particular switch assembly in parallel with the particular circuit for said motor to provide a reset circuit for each motor, and switch means in said reset circuits holding them open if the lowerator, elevator, lower rack conveyor, or upper rack conveyor concerned has completed its movement.

References Cited in the file of this patent

UNITED STATES PATENTS

| | | |
|---|---|---|
| 1,689,099 | Applegate | Oct. 23, 1928 |
| 1,837,605 | Baker | Dec. 22, 1931 |
| 2,104,282 | Wagener | Jan. 4, 1938 |
| 2,251,197 | Nestmann | July 29, 1941 |
| 2,386,760 | Warner | Oct. 16, 1945 |
| 2,583,847 | Hummel | Jan. 29, 1952 |
| 2,642,503 | Dietrich | June 16, 1953 |
| 2,669,615 | Cox | Feb. 16, 1954 |

FOREIGN PATENTS

| | | |
|---|---|---|
| 576,381 | Great Britain | Apr. 1, 1946 |